(12) United States Patent
Golub

(10) Patent No.: US 11,559,036 B2
(45) Date of Patent: Jan. 24, 2023

(54) PORTABLE, COLLAPSIBLE, OPENED WINDOW MOUNTED ENCLOSURE WITH REDUNDANT FALL PREVENTION

(71) Applicant: Dean G Golub, Chicago, IL (US)

(72) Inventor: Dean G Golub, Chicago, IL (US)

( * ) Notice: Subject to any disclaimer, the term of this patent is extended or adjusted under 35 U.S.C. 154(b) by 255 days.

(21) Appl. No.: 17/062,690

(22) Filed: Oct. 5, 2020

(65) Prior Publication Data

US 2022/0104454 A1   Apr. 7, 2022

(51) Int. Cl.
*A01K 1/035* (2006.01)
*E06B 7/32* (2006.01)
*E06B 9/00* (2006.01)

(52) U.S. Cl.
CPC .............. *A01K 1/035* (2013.01); *E06B 7/32* (2013.01); *E06B 2009/002* (2013.01)

(58) Field of Classification Search
CPC .......... A01K 1/02; A01K 1/034; A01K 1/035; A01K 1/03; A01K 1/031; A01K 1/032; A01K 1/033; E06B 7/32; E06B 2009/002; E06B 7/28; E06B 9/52
USPC .......................... 119/165, 452, 482, 484, 485
See application file for complete search history.

(56) References Cited

U.S. PATENT DOCUMENTS

| | | | | |
|---|---|---|---|---|
| 1,512,792 A | * | 10/1924 | Nelson | A47L 3/02 182/113 |
| 2,758,456 A | * | 8/1956 | Wheeler | F24F 1/027 62/262 |
| 3,010,534 A | * | 11/1961 | Borke | E04G 3/18 182/58 |
| 4,161,924 A | * | 7/1979 | Welker | A01K 1/033 119/784 |
| 7,530,331 B1 | * | 5/2009 | Malachowski | A01K 1/035 119/484 |
| 2007/0163512 A1 | * | 7/2007 | Di Angelo | A01K 15/025 119/28.5 |
| 2016/0192613 A1 | * | 7/2016 | Fickes | A01K 1/0245 119/497 |
| 2016/0262344 A1 | * | 9/2016 | Martinez, III | A01K 1/03 |
| 2019/0352104 A1 | * | 11/2019 | Cano Coscia | E06B 7/32 |

* cited by examiner

*Primary Examiner* — William V Gilbert

(57) ABSTRACT

An enclosure which can be mounted into a common opened window, having a redundant series of attachments and engagements which minimize the likelihood of the enclosure and the enclosure's contents from falling to the ground outdoors. In the event that one attachment or engagement fails; the other attachments and engagements function together to prevent the enclosure from falling to the ground outdoors. An enclosure which requires minimal assembly by the user. An enclosure which is collapsible, portable, and lightweight. An enclosure which can be constructed of strong and rigid materials which are inexpensive and some are renewable. An enclosure which can be easily manufactured. An enclosure which self-adjusts to the length of various window sashes. An enclosure which can prevent insects and rain from entering the home. An enclosure which is sheltered from precipitation and sun. An enclosure which can be configured differently, and repurposed by the user.

1 Claim, 19 Drawing Sheets

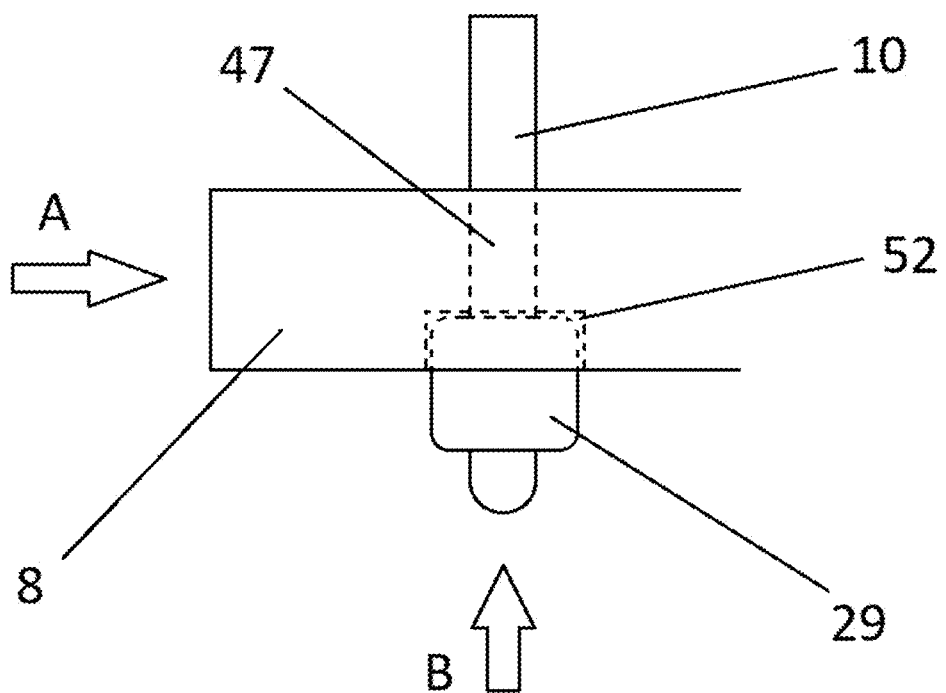

PORTABLE, COLLAPSIBLE, OPENED WINDOW MOUNTED ENCLOSURE WITH REDUNDANT FALL PREVENTION

BACKGROUND OF THE INVENTION

There are millions (if not billions) of pets around the world. A vast number of these pets are indoor pets. These pets are instinctively interested in the outside world because they have evolved as outside creatures. These pets' humans struggle with being able to safely provide the pet with outdoor access. This is true with cats and other smaller pets. This is especially true with cats and other smaller pets who live in cities.

There are millions of window-fitted air conditioners around the world. These air conditioners protrude from windows toward the outdoors. A vast majority of these air conditioners structurally engage the window's lower sash, stoop, and occasionally, sash channels. A vast majority of these air conditioners will fall from windows from which they protrude if any of these engagements fail to hold the air conditioner in the window. There are numerous examples of this actually happening and causing damage and injury.

There are numerous plant enthusiasts around the world who wish to place their plants outside of their windows in an effort to expose their plants to more sun.

Enclosures

There have been several ideas about how to allow pets to have access to the outside without actually letting these pets roam at will due to the dangers presented by the outside world.

| Pat. No. | Inventor | Date Issued |
| --- | --- | --- |
| 1,460,945 | Chapin | Jul. 3, 1923 |
| 1,575,683 | Groves | Mar. 9, 1926 |
| 4,021,975 | Calkins | May 10, 1977 |
| 4,022,263 | Beckett | May 10, 1977 |
| 4,023,306 | Ruggieri | May 17, 1977 |
| 4,029,048 | Gershbein | Jun. 14, 1977 |
| 4,057,031 | Williams | Nov. 8, 1977 |
| 4,224,899 | Cruchelow | Sep. 30, 1980 |
| 4,256,056 | Sou | Mar. 17, 1981 |
| 4,291,645 | Cruchelow | Sep. 19, 1981 |
| 4,445,459 | Julie | Mar. 1, 1984 |
| 4,484,540 | Yamamoto | Nov. 27, 1984 |
| 4,673,606 | Ondrasik | Aug. 16, 1988 |
| 4,788,934 | Fetter | Dec. 16, 1988 |
| 4,803,951 | Davis | Feb. 14, 1989 |
| 4,811,968 | Bolden | Mar. 14, 1989 |
| 4,858,561 | Springer | Aug. 22, 1989 |
| 4,909,188 | Tominaga | Sep. 20, 1990 |
| 4,917,047 | Wazeter | Apr. 17, 1990 |
| 4,389,546 | Cannaday | Feb. 5, 1991 |
| 5,000,121 | Daily | Mar. 19, 1991 |
| 5,016,571 | Totaro | May 21, 1991 |
| 5,054,426 | Panarelli | Oct. 8, 1991 |
| 5,113,793 | Leader | May 19, 1992 |
| 5,148,767 | Torchio | Sep. 22, 1992 |
| 5,167,202 | Bradford | Dec. 1, 1992 |
| 5,195,457 | Namanny | Mar. 23, 1993 |
| 5,261,350 | Vavrek | Nov. 16, 1993 |
| 5,277,148 | Rossignol | Jan. 11, 1994 |
| 5,337,697 | Trimarchi | Aug. 16, 1994 |
| 5,353,738 | Chiu | Oct. 11, 1994 |
| 5,469,807 | Kozmaczeska | Nov. 28, 1995 |
| 5,522,344 | Demurjian | Jun. 4, 1996 |
| 5,803,019 | Heilborn | Sep. 8, 1998 |
| 5,890,455 | Donchey | Apr. 6, 1999 |
| 6,082,305 | Burns | *Jul. 4, 2000 |
| 6,470,829 | Spangler | Oct. 29, 2002 |

Of all the inventions referenced above; only a few comparisons to the present invention will be made:

4023306 issued to Ruggieri on May 17, 1977 was designed to be fitted into an opened window. Ruggieri's invention differs from the present invention because:
- Ruggieri's design does not self-adjust to engage the window's sash channels. It must be adjusted by the person who fits the device into a window
- Ruggieri's design does not engage lower window sash's points of maximum leverage against outward force against said sash's lower rail
- Ruggieri's design does not have a redundant series of attachments and engagements which can prevent invention from falling to the ground outdoors 4989546 issued to Cannaday on Feb. 5, 1991 was designed to be fitted into an opened window. Cannaday's invention differs from the present invention because:
- Cannaday's design does not self-adjust to engage the side sash channels.
- Cannaday's design does not structurally engage sash channels
- Cannaday's design does not engage lower window sash's points of maximum leverage against outward force against said sash's lower rail
- Cannaday's design does not have a redundant series of attachments and engagements which can prevent invention from falling to the ground outdoors
- Cannaday's design is not collapsible 5148767 issued to Torchio on Sep. 22, 1992 was designed to be fitted into an opened window. Torchio's invention differs from the present invention because:
- Torchio's design does not self-adjust to engage the side sash channels.
- Torchio's design does not structurally engage sash channels
- Torchio's design does not engage lower window sash's points of maximum leverage against outward force against said sash's lower rail
- Torchio's design does not have a redundant series of attachments and engagements which can prevent invention from falling to the ground outdoors
- Torchio's design is not collapsible 5522344 issued to Demurjian on Jun. 4, 1996 was designed to be fitted into an opened window. Demurjian's invention differs from the present invention because:
- Demurjian's design does not self-adjust to engage the side sash channels.
- Demurjian's design does not structurally engage sash channels
- Demurjian's design does not engage lower window sash's points of maximum leverage against outward force against said sash's lower rail
- Demurjian's design does not have a redundant series of attachments and engagements which can prevent invention from falling to the ground outdoors 6470829 issued to Spangler on Oct. 29, 2002 was designed to be fitted into an opened window. Spangler's invention has apparatus to expand the interior of enclosure upon unfolding the enclosure like present invention. Spangler's invention is very similar to present invention; however, Spangler's invention differs from the present invention because:
- Spangler's design does not self-adjust to engage the side sash channels.
- Spangler's design does not structurally engage sash channels Spangler's design does not engage lower window sash's points of maximum leverage against outward force against said sash's lower rail Spangler's design does not have a redundant series of attachments and engagements which can prevent invention from falling to the ground outdoors Pet owners need to assure that their pet is safe while using these window-mounted enclosures. They need to assure that their pets have access to fresh air, have unobstructed views of the outside world, are not exposed to too much heat or cold, and cannot fall to the ground outside (especially if they live high above the ground).

Of all the patented enclosures designed to be mounted into opened window; the present invention differs because:
  None are equipped with a redundant system of engagements and attachments which can prevent invention from falling to the ground outdoors
  None engage lower window sash's points of maximum leverage against outward force against said sash's lower rail
  None self-adjust to the width of sash channels structurally
  None use suspension cables to simultaneously support indoor and outdoor platforms
  None use suspension cables as flexible attachment points which simultaneously allow indoor and outdoor shelves to fold and unfold to a vertical member.
Folding or Collapsible Shelves There have been several ideas about folding or collapsible shelves.

| Pat. No. | Inventor | Date Issued |
| --- | --- | --- |
| 170,115 | Roberts | Nov. 16, 1875 |
| 179,071 | Shirley | Jun. 20, 1876 |
| 678,031 | Peach | Jul. 9, 1901 |
| 721,488 | Witham & Byrne | Feb. 24, 1903 |
| 727,423 | Oppenheimer | May 5, 1903 |
| 841,574 | Sandhofer | Jan. 15, 1907 |
| 858,112 | Smart | Jun. 25, 1907 |
| 1,518,091 | Mathis | Apr. 4, 1924 |
| 1,897,810 | Mallory | Feb. 14, 1933 |
| 2,059,011 | Moewes | Oct. 27, 1936 |
| 2,205,193 | Goldman | Jun. 18, 1940 |
| 2,441,037 | Sherrin | May 4, 1948 |
| 2,510,175 | Hess | Jun. 6, 1950 |
| 3,364,885 | Brothers | Jan. 23, 1968 |
| 4,188,891 | Boyajian | Feb. 19, 1980 |
| 4,195,577 | Gross | Apr. 1, 1980 |
| 5,020,756 | Bauer | Jun. 4, 1991 |
| 5,794,385 | Donovan | Aug. 18, 1998 |
| 1,347,116 | Morgan | Jul. 20, 1920 |
| 1,917,336 | Spitz | Jul. 11, 1933 |
| 2,069,067 | Hoffman | Jan. 26, 1937 |
| 3,285,206 | Hoffman | Nov. 15, 1966 |

Of all the patented folding shelves; the present invention differs because:
  None are equipped with a redundant system of engagements and attachments which are designed to prevent the shelf from falling to the ground outdoors
  None offer simultaneous access to the outdoors and indoors for pets
  None can restrict insect traversal from the outdoors to indoors
  None can restrict temperature traversal from the indoors to outdoors and vice versa
  None are equipped with enclosures
Fall Prevention There have been examples of enclosures which are designed to prevent the contents of said enclosure from falling to the ground outdoors.

| Pat. No. | Inventor | Date Issued |
| --- | --- | --- |
| 8,414,367 | Virag et al | Apr. 9, 2013 |
| 8,998,690 | Virag et al | Apr. 7, 2015 |

With regard to enclosures which prevent contents within said enclosure from falling to the ground outdoors:
  None are equipped with a redundant system of engagements and attachments which are designed to prevent the air conditioner from falling to the ground outdoors
  None offer simultaneous access to the outdoors and indoors
  None offer insect traversal protection from the outdoors to indoors
  None offer temperature traversal protection from the indoors to outdoors and vice versa

SUMMARY OF THE INVENTION

The main objects of the present invention are to provide an opened window mounted enclosure which:

1. Has a series of weight bearing (structural) engagements and attachments which minimize the likelihood of the enclosure falling to the ground outside
2. Can be placed in an opened window and secured to various indoor locations
3. Can be comprised of rigid, strong, and inexpensive materials
4. Is easy to manufacture
5. Engages a window sash very close to window sash channels which are the points where a window sash has the most strength against inward and outward force
6. Is collapsible
7. Is portable
8. Can be configured in various ways
9. Has a weight bearing outdoor enclosure which protrudes from a common opened window and prevents contents from falling to the ground below the enclosure

DETAILED DESCRIPTION OF THE DRAWINGS

A supplemental glossary of terms has been provided at end of detailed explanations of figures.

All references to direction assume that present invention has been mounted into an opened window as it was designed to.

Figure 1:
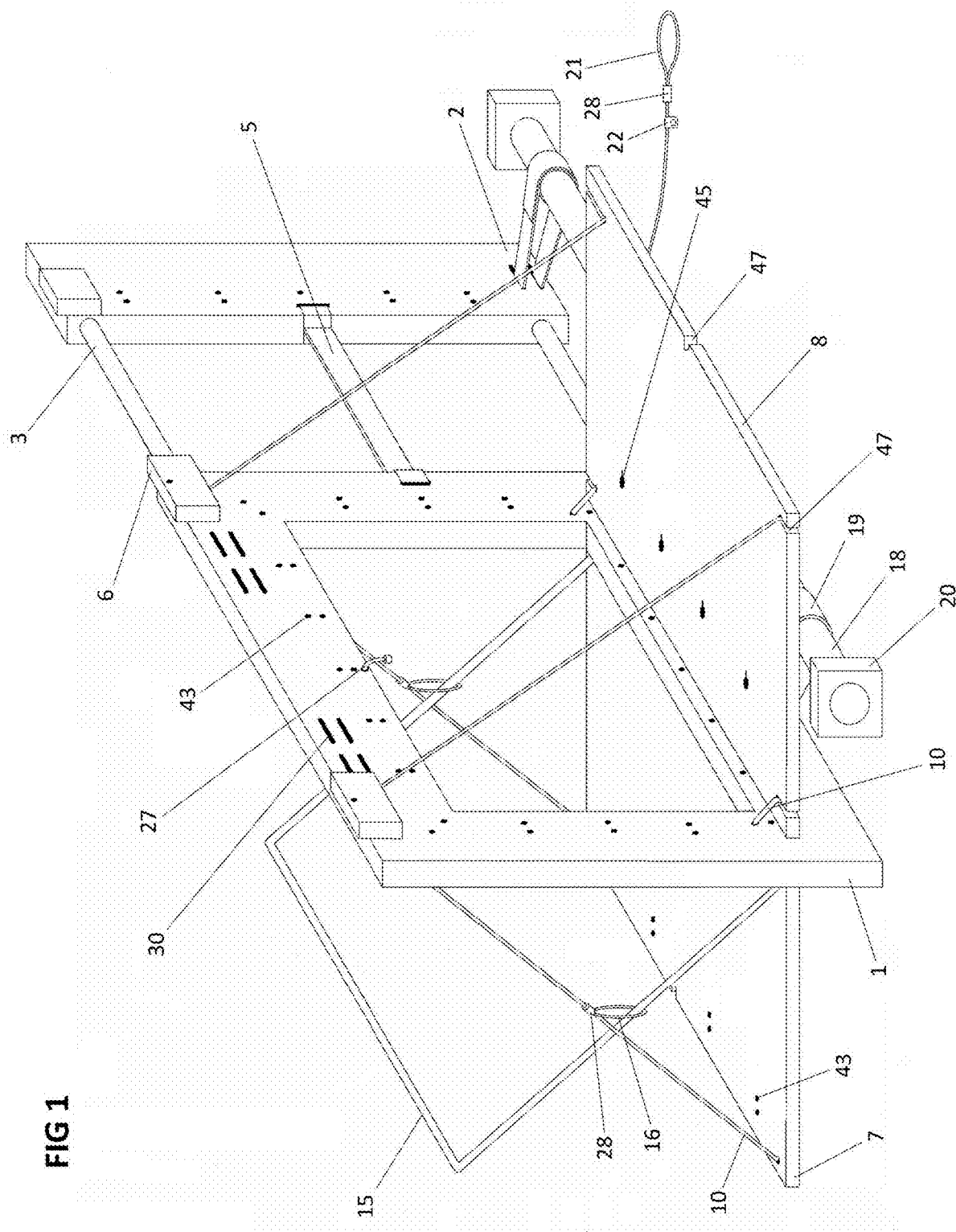
FIG. 1 Partial perspective view of present invention from slightly above and to the left of the invention as seen from indoors
FIG. 2 Partial perspective view of present invention from slightly below and to the right of the present invention as seen from outdoors
FIG. 3 Elevation view of present invention in an opened state
FIG. 4 Elevation view of present invention in a closed state
FIG. 5 Plan view of Safety Bar apparatus
FIG. 6 Truncated view of Safety Lanyard apparatus
FIG. 7 Perspective view of Enclosure
FIG. 8 Elevation view of present invention as seen from outdoors
FIG. 9 Elevation view of present invention as seen from indoors
FIG. 10 Elevation view of Safety Bar Attachment Strap
FIG. 11 Perspective view of Safety Bar Attachment Strap
FIG. 12 Perspective view of Canopy
FIG. 13 Perspective view of Barrier and Barrier Extension
FIG. 14 Elevation view of Climbing Net
FIG. 15 Perspective view of Outdoor Screen
FIG. 16 Elevation view of separation Bar Bend
FIG. 17 Partial plan view of present invention FIG. 18 Perspective view of Cable Slot FIG. 19 Elevation view of Cable Slot
Figure 2:
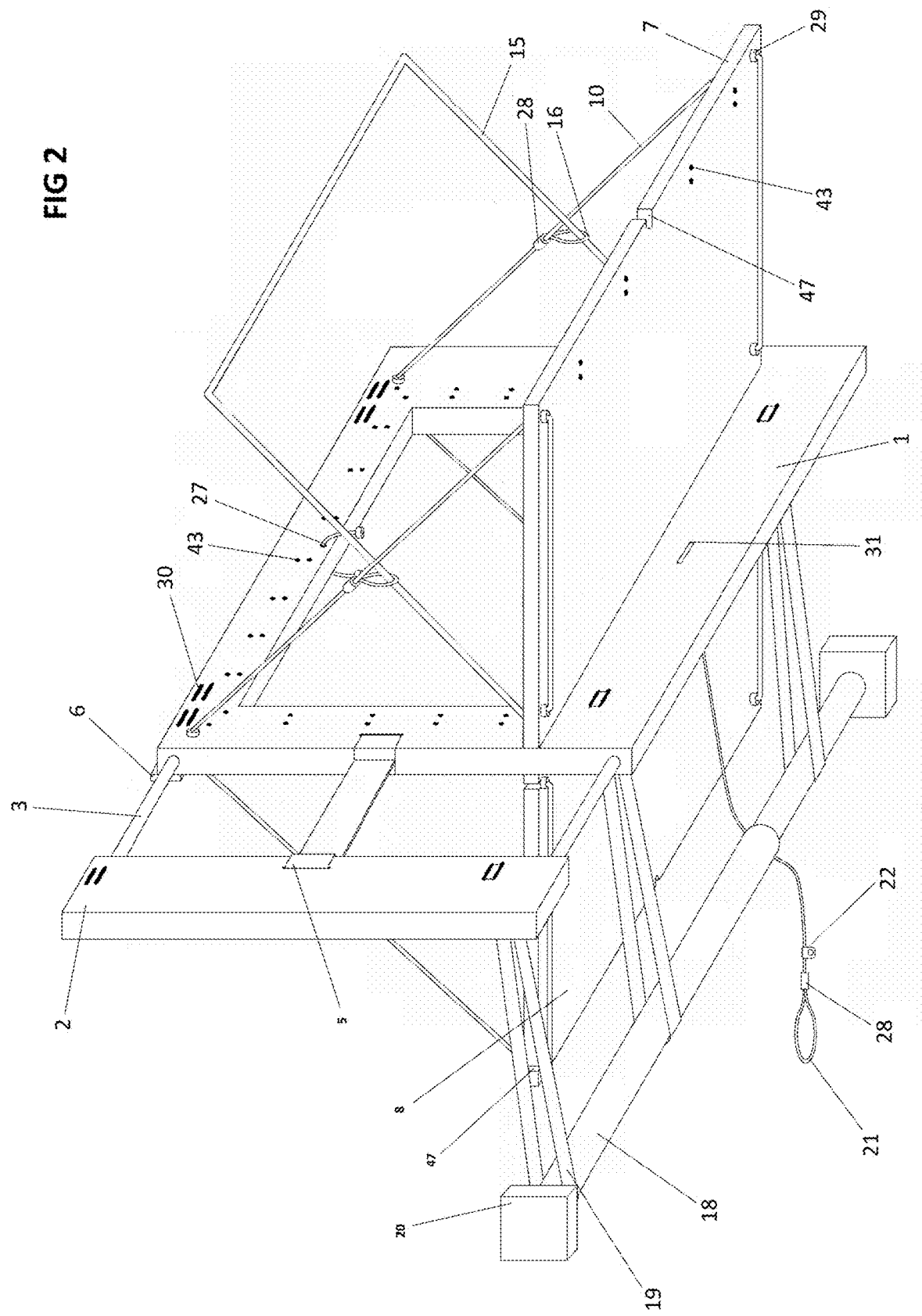

With regard to FIGS. 1 and 2 which depict two different partial perspective views of the present invention. All parts of the invention not shown in FIGS. 1 and 2 were deliberately omitted to show certain aspects of present invention. Frame 1 and frame extension 2 can be planar objects which fit vertically into, and adjust to the horizontal width of window sash channels 34 of an opened window. With regard to suspension cables 10; frame 1 acts similarly to a pylon commonly seen on a suspension bridge which provides a weight bearing point for suspension cables 10. Frame 1 structurally engages a window sash channel 34 of an opened window to prevent movement toward the outdoors and indoors at side end of frame 1. Frame 1 engages a window stool 35 to prevent movement toward the indoors at lower end of frame 1. Frame 1 has sash engagement flanges 6 which engage a window sash 37 to prevent movement toward the outdoors at upper end of frame 1. Frame extension 2 engages the opposite window sash channel 34 which frame 1 engages. Frame extension 2 prevents movement toward the outdoors and indoors at one side end of frame 1. Frame extension rods 3 slide into and out of holes 31 in side end of frame 1, and are forced out of frame 1 by the urging of springs 4 which are seated in said holes in one side end of frame 1. Frame extension retainer 5 attaches frame extension 2 to frame 1 which then retains frame extension rods 3, and springs 4 within holes 31 in side end frame 1. Suspension cables 10 traverse through holes in outdoor shelf 7 which permanently attach said outdoor shelf to, and suspend said outdoor shelf from frame 1. Outdoor shelf 7 and enclosure 11 are permanently attached to frame 1 so that the contents of said enclosure are afforded the securement provided by safety lanyard 21 and safety bar 18. Safety lanyard 21 can have additional securement provided by screw down cable clamp[s] 22. Safety bar 18 has safety bar ends 20 which engage an interior wall 38. Suspension cables 10 can be inserted into cable slots 47 in indoor shelf 8 to suspend said indoor shelf from, and allow said indoor shelf to removably attach to frame 1. Shelves (7 and 8) can be comprised of rigid, planar material. Suspension cables 10 are a flexible attachment point between frame 1 and shelves (7 and 8). Suspension cables 10 are fitted with cable stops 29 which are larger in diameter than said suspension cables and the plurality of holes 31 through which said suspension cables traverse. Cable stops 29 prevent suspension cables 10 from sliding through the plurality of holes 31 in frame 1 and shelves (7 and 8) through which said suspension cables traverse. Cable stops 29 at various predetermined locations on suspension cables 10 allow shelves (7 and 8) to be opened to positions of planar inequality relative to frame 1, and restrict said shelves from exceeding a ninety-degree angle relative to frame 1. Shelves (7 and 8) can be folded, toward frame 1 into a position of planar equality with frame 1 and held in that position by a shelf retainer 27 which can be inserted into cable slots 47 on said shelves. Suspension cables 10 transfer downward force from weight on shelves (7 and 8) to upper end of frame 1 which is then transferred through frame 1 to a window sill 36. Frame 1 has slots 30 for safety bar attachment straps 19 and canopy attachment straps 13 to traverse through which can attach safety bar 18 and canopy 12 to frame 1. Safety bar 18 can be attached to upper end or lower end of frame 1 and frame extension 2. Outdoor shelf 7 has holes 31 for separation bar 15. Separation bar 15 is loosely fitted into holes 31 through outdoor shelf 7 which flexibly attaches separation bar 15 to outdoor shelf 7, which allows separation bar 15 to move toward outdoor shelf 7 which simultaneously collapses enclosure 11 toward outdoor shelf 7 and canopy 12 toward frame 1 when outdoor shelf 7 is in a position of planar equality with frame 1. Separation bar 15 is held closely to suspension cables 10 with separation bar retainer loops 16 which are attached to suspension cables 10 with ferrules 28. When outdoor shelf 7 is in a perpendicular position relative to frame 1, separation bar retainer loop 16 maintains a fixed angle between separation bar 15 and outdoor shelf 7, which allows separation bar 15 to separate top of enclosure 11 from outdoor shelf 7. When outdoor shelf 7 is in a perpendicular position relative to frame 1, the attachment point between canopy 12 and separation bar 15 is at its farthest point from frame 1 which applies tension to said canopy and extends said canopy over enclosure 11. Outdoor shelf 7 can have attachment holes 43 at predetermined locations which enclosure 11 can be attached to with attachment cable 42. Frame 1 has attachment holes 43 for attachment cable 42, which attaches enclosure 11 and barrier attachment strips 46 to frame 1. Indoor shelf 8 has climbing net attachment holes 45 through it for attachment of climbing net 9. Indoor shelf 8 has cable slots 47 which facilitate suspension cables 10 to be removably attached to indoor shelf 8 which facilitates removable attachment of indoor shelf 8 to frame 1. Frame 1 has holes 31 for safety lanyard 21 to traverse through, and attach to frame 1. The preferred embodiment for frame 1 and shelves (7 and 8) is water resistant wood. The preferred embodiment for suspension cables 10 is stainless steel cable. The preferred embodiment for frame extension rods 3 is fiberglass. The preferred embodiment for frame extension retainer 5 is woven fabric material that is strong and lightweight and has hook and loop fastening material 32 sewn on. Frame 1 can be manufactured by cutting wood of a predetermined thickness into strips of a predetermined width. Then said strips are cut to predetermined lengths to create the pieces of frame 1. Then holes and slots of varying sizes can be created at predetermined locations in said pieces of frame 1 to accommodate sash engagement flanges 6, suspension cables 10, safety bar attachment straps 19, canopy attachment straps 13, attachment cable 42, frame extension rods 3, springs 4, frame extension retainer 5, safety lanyard 21, pegs 50, and threaded fasteners 51. Then the pieces of frame 1 can be assembled with pegs 50 and threaded fasteners 51 such that the free movement of springs 4 and frame extension rods 3 is unimpeded. Frame extension 2 can be manufactured by cutting wood of a predetermined thickness into strips of a predetermined width. Then said strips can be cut to predetermined lengths to create frame extension 2. Then holes 31 and slots 30 of varying sizes can be created at predetermined locations through said frame extension 2 to accommodate sash engagement flange 6, safety bar attachment strap 19, frame extension rods 3, attachment cable 42, and frame extension retainer 5. Then frame extension 2 can be attached to frame extension rods 3 with pegs 50 or threaded fasteners 51 such that frame extension rods 3 are permanently attached to frame extension 2. Shelves (7 and 8) can be manufactured by cutting wood of a predetermined thickness into strips of a predetermined width. Then said strips can be cut to predetermined lengths to create shelves (7 and 8).

Then holes 31 and cable slots 47 can be created at predetermined locations through shelves (7 and 8) to accommodate suspension cables 10, shelf retainer 27, and separation bar 15. Outdoor shelf 7 can have attachment holes 43 created at predetermined locations which enclosure 11 can be attached to with attachment cable 42. Indoor shelf 8 can have climbing net attachment holes 45 to accommodate attachment of climbing net 9. Indoor shelf 8 can be removably attached to suspension cables 10 for any reason. Suspension cable 10 can be manufactured by cutting predetermined lengths of metal cable. Suspension cable 10 can be installed into present invention by feeding said lengths of metal cable material through a predetermined sequence of holes, cable stops, ferrules, and slots; then crimping said cable stops and ferrules onto said cable at predetermined locations. One embodiment of suspension cable can be woven fabric material has been attached to itself creating loops which can have short lengths of rod material inserted into said loops creating impediments which cannot fit through slots which may exist in frame 1 and shelves (7 and 8) thus creating stops similar to cable stops 29. One embodiment of suspension cable can be rope material with tubular sleeves of a larger diameter than said rope material fixed at predetermined locations along said rope material with knots tied in said rope material, which cannot fit through holes in frame 1 or shelves (7 and 8) thus creating stops similar to cable stops 29. The preferred embodiment of suspension cables 10 is stainless steel cable with cable stops 29 and ferrules 28.

Figure 3:
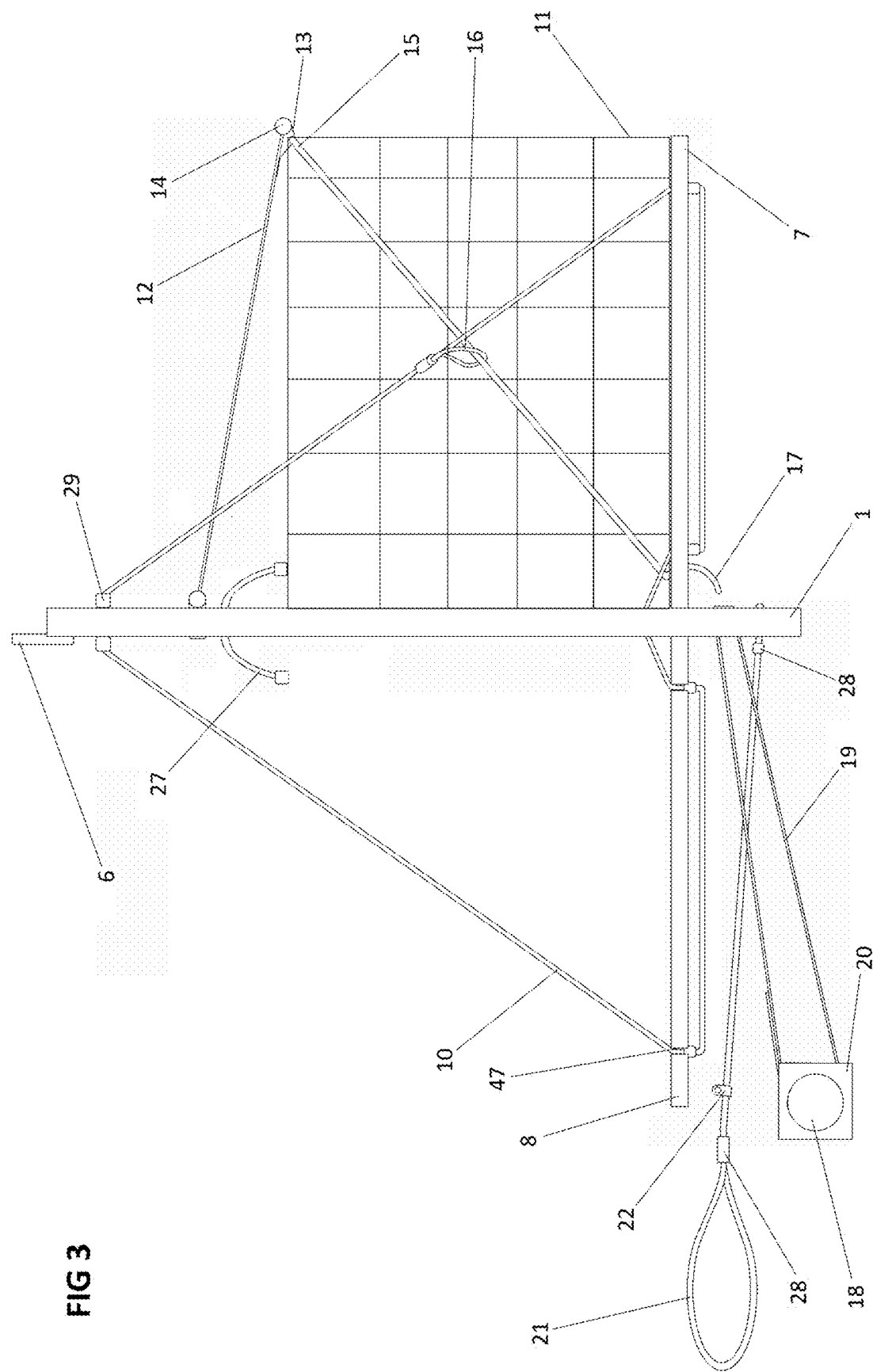

With regard to FIG. 3 which depicts an elevation view of the present invention. All parts of the invention not shown in FIG. 3 were deliberately omitted to show certain aspects of present invention. Frame 1 is a rigid structure to which other members of the invention are, and can be attached. Suspension cables 10 traverse through holes 31 in frame 1 and shelves (7 and 8) which can support shelves (7 and 8) in a level position, and separation bar 15 at a fixed angle relative to outdoor shelf 7. Separation bar bend 17 flexibly attaches separation bar 15 to outdoor shelf 7. Suspension cables 10 are fitted with cable stops 29 and ferrules 28, and separation bar retainer loop 16 which maintain fixed distances between objects through which said suspension cables traverse as well as couple the ends of said suspension cables together. Sash engagement flanges 6 engage a window sash 37 to prevent movement toward the outdoors at top end of frame 1 frame extension 2. Safety bar 18 attaches to frame 1 and frame extension 2 with safety bar attachment straps 19 which traverse through slots 30 cut through frame 1. Safety bar 18 has safety bar ends 20 which engage an interior wall 38. Safety lanyard 21 is attached to frame 1 by traversing through two holes 31 in frame 1 and attaching onto itself with a ferrule 28. Safety lanyard 21 can prevent present invention from falling to the ground outdoors by attaching to various objects indoors. Safety lanyard 21 can have additional securement provided by screw down cable clamp[s] 22. Enclosure 11 can contain pets or other objects and prevent said pets or objects from falling to the ground or escaping to the outdoors. Canopy 12 provides shelter from sun and precipitation to objects within enclosure. Canopy 12 can be attached to frame 1 and separation bar 15 with canopy attachment straps 13. The ends of canopy 12 have loops into which canopy rods 14 can be inserted to provide rigidity to said ends of canopy 12. Outdoor shelf 7 can have attachment holes 43 at predetermined locations which enclosure 11 can be attached to with attachment cable 42. Indoor shelf 8 has cable slots 47 which facilitate suspension cables 10 to be removably attached to indoor shelf 8 which facilitates removable attachment of indoor shelf 8 to frame 1. Shelves (7 and 8) can be folded into a position of planar equality with frame 1 and held in that position with shelf retainer 27.

Figure 4:
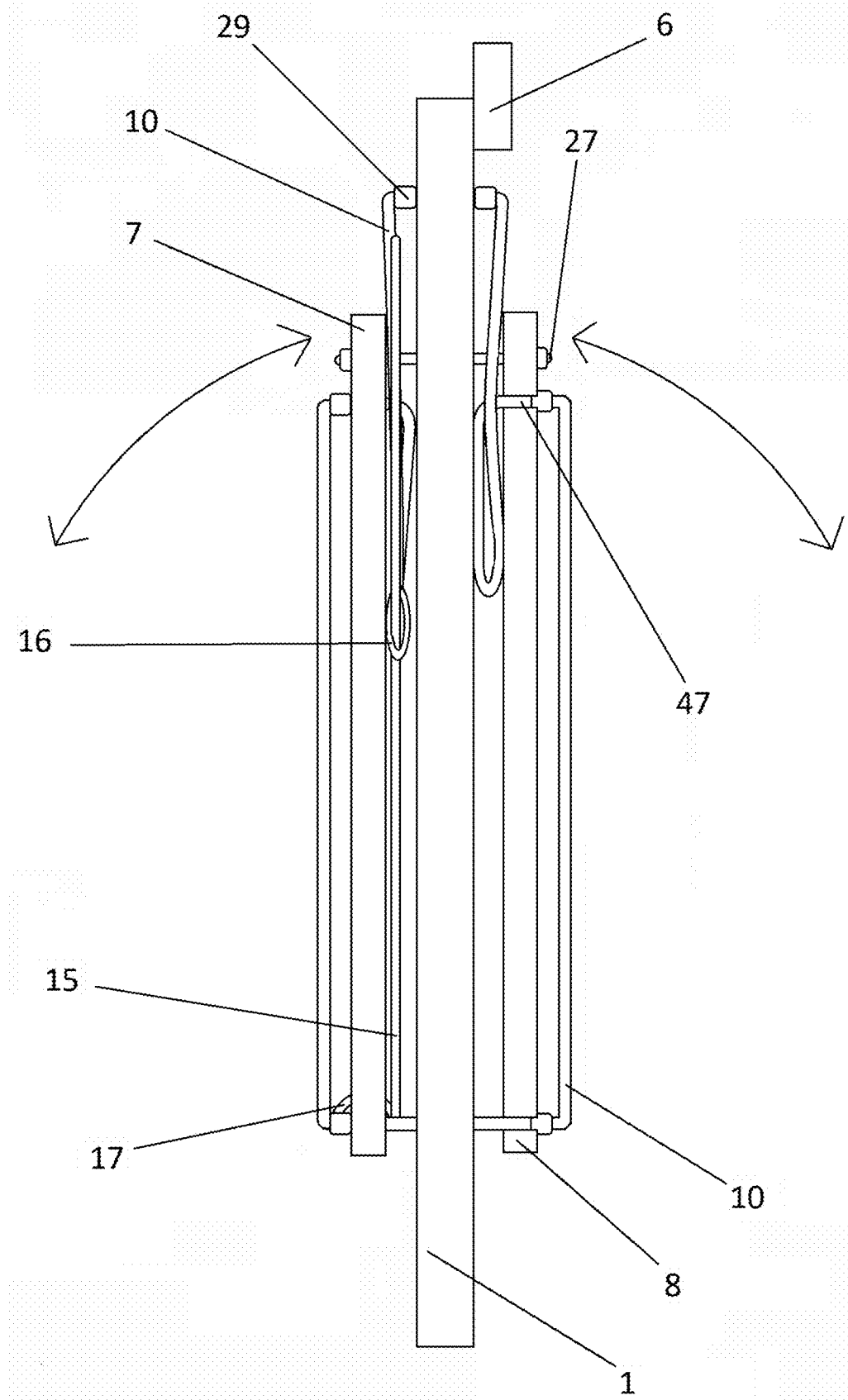

With regard to FIG. 4 which depicts an elevation view of present invention in a folded state with shelves (7 and 8) in a position of planar equality with frame 1. All parts of the invention not shown in FIG. 4 were deliberately omitted to show certain aspects of present invention. Shelves (7 and 8) are folded in an upward direction to the opposing faces of, and sandwich frame 1 as directional arrows indicate. Frame 1 and frame extension 2 have sash engagement flanges 6 which engage a window sash 37 to prevent movement toward the outdoors at upper end of frame 1 and frame extension 2. Separation bar 15 simultaneously collapses a canopy 12 toward frame 1 and enclosure 11 toward outdoor shelf 7. The enclosure 11 is collapsed between shelves (7 and 8). The suspension cables 10 act as a flexible attachment point between shelves (7 and 8) and frame 1. Shelves (7 and 8) can be held in a position of planar equality with frame 1 by inserting shelf retainer 27 into cable slots 47 in said shelves. Separation Bar Retainer Loop 16 fits loosely around separation bar 15 is attached to suspension cable 10 with a ferrule 28. Separation Bar Bends 17 are crescent shaped bends at both ends of separation bar 15 which flexibly attach separation bar 15 to outdoor shelf 7. The preferred embodiment for the shelf retainer 27 is stainless steel cable with cable stops 29. Indoor shelf 8 has cable slots 47 which facilitate suspension cables 10 to be removably attached to indoor shelf 8 which facilitates removable attachment of indoor shelf 8 to frame 1.

Figure 5:
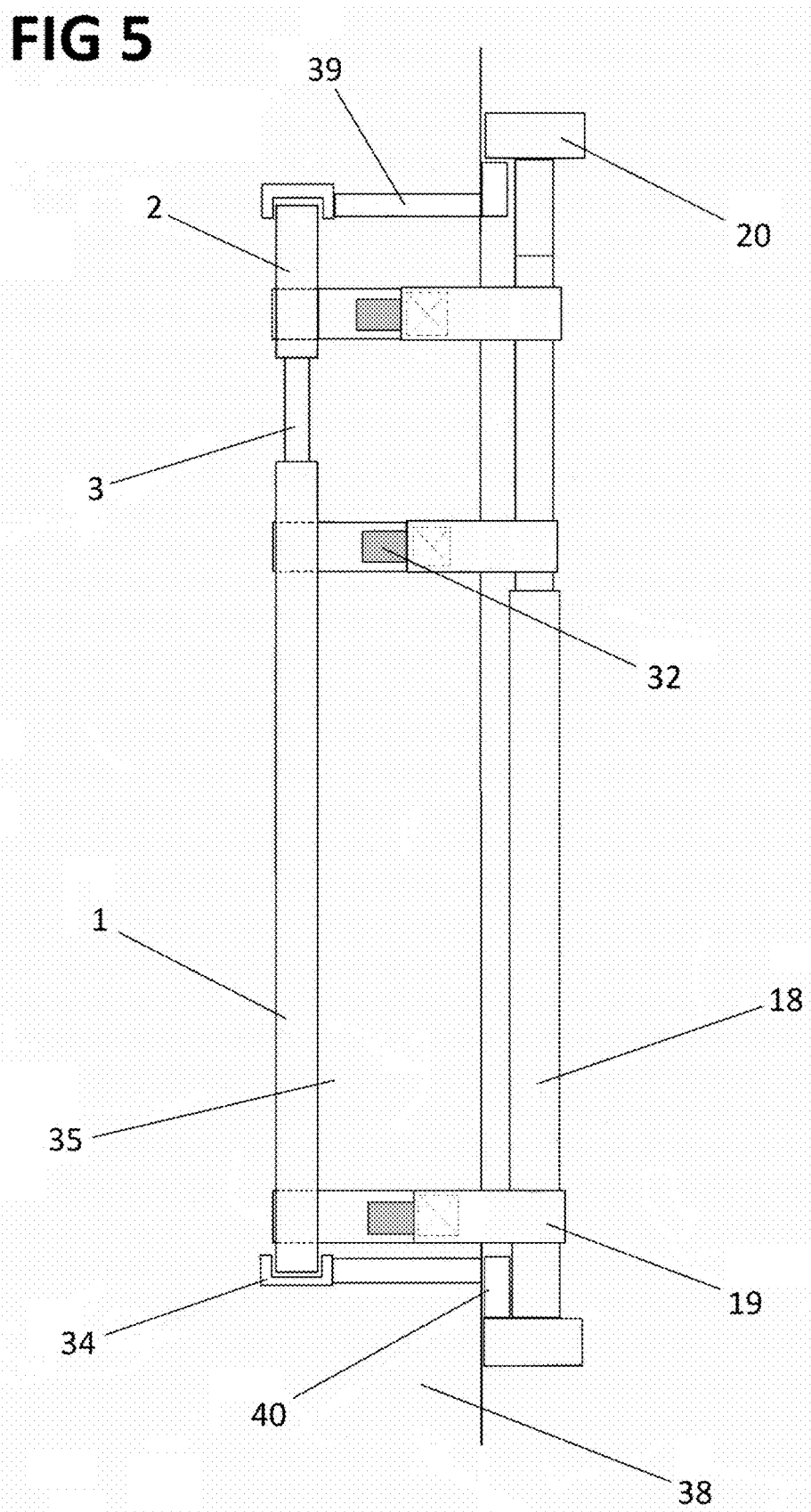

With regard to FIG. 5 which depicts a plan view of the present invention. All parts of the invention not shown in FIG. 5 were deliberately omitted to show how safety bar 18, frame 1, and frame extension 2 engage the apparatus of an opened window. Frame 1 and frame extension 2 are prevented from moving toward the indoors by window sash channels 34 and window stool 35. Safety bar 18 attaches to frame 1 with two safety bar attachment straps 19 which holds static the distance between frame 1 and safety bar 18. Safety bar 18 attaches to frame extension 2 with a safety bar attachment strap 19 which holds static the distance between frame extension 2 and safety bar 18. Safety bar attachment straps 19 can have hook and loop fastening material 32 attached. The preferred embodiment for safety bar ends 20 are cuboid or triangular prism shaped, rigid, and are constructed from, or can have attached, material which exhibits high friction properties such as rubber. Frame 1 cannot move toward the outdoors when the distance between frame 1 and safety bar 18 is held at its minimum distance by safety bar attachment straps 19, because any force from frame 1 moving toward the outdoors is transferred to safety bar 18. Frame extension 2 cannot move toward the outdoors when the distance between frame extension 2 and safety bar 18 is held at its minimum distance by a safety bar attachments strap 19, because any force from frame extension 2 moving toward the outdoors is transferred to safety bar 18. When movement toward the outdoors of frame 1 and/or frame extension 2 occurs; safety bar ends 20 engage the interior wall 38 next to the window casing 40, and transfer all force generated by safety bar 18 moving toward the outdoors to an interior wall 38. A similar concept to the present invention's safety bar 18 is a cross bar demonstrated by Thompson in invention 7926424 Nov. 20, 2007. The difference between Thompson's invention and present invention is that safety bar 18 can be oriented in a non-level fashion, and the length of safety bar 18 can be adjusted. When engaged in a non-level fashion; one safety bar end 20 can engage interior wall 38 under a window stool 35 and the other safety bar end 20 can engage interior wall adjacent to window. Engaging safety bar 18 in a non-level fashion allows present invention to be mounted in windows which are adjacent to other windows. Frame 1 and frame extension 2 are constantly forced apart by springs 4 urging frame extension rods 3 out of holes 31 at side end of frame 1. This force causes the present invention to expand to the same length as a window sash 37. A similar concept to the present invention using a spring to generate separation force between two members, and hold said members into another apparatus, is elegantly demonstrated by Balz in invention 2492728. When present invention is seated in window sash channels 34 and is the same length as a window sash 37; present invention cannot exit window sash channels 34 toward the outdoors or toward the indoors. The preferred embodiment for the safety bar 18 is fiberglass tubing. The preferred embodiment for safety bar attachment straps 19 is woven fabric material. The preferred embodiment for springs 4 is coiled steel. Window frame 40 is fastened to vertical and horizontal members that exist within the interior wall 38.

Figure 6:
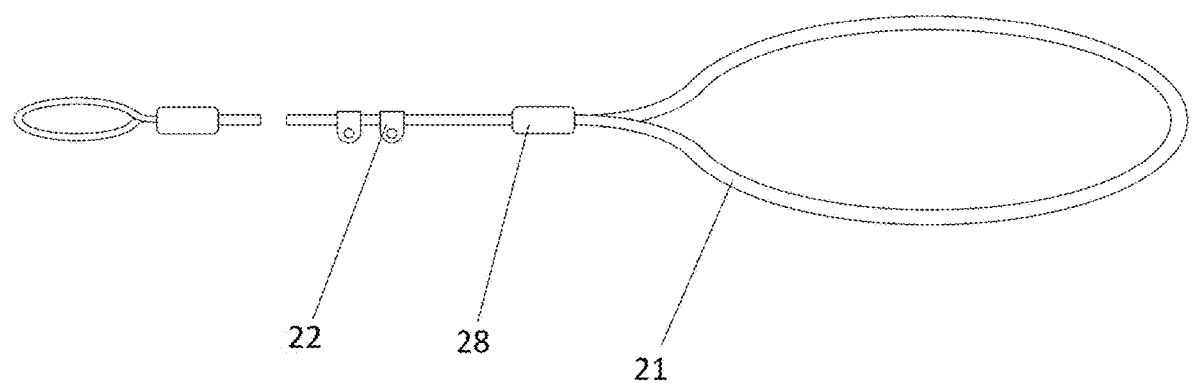

With regard to FIG. 6 which depicts a truncated view of the safety lanyard 21. All parts of the present invention not shown in FIG. 6 were deliberately omitted to show safety lanyard 21. Both ends of safety lanyard 21 are looped back onto, and secured to, safety lanyard 21 with cable ferrules 28. One end of safety lanyard 21 is looped through two holes 31 in frame 1 back onto itself, and secured in that position with a cable ferrule 28. The safety lanyard 21 can be attached with screw down cable clamp[s] 22 to vertical support members (commonly referred to as studs) or horizontal support members (commonly referred to a headers) within an interior wall 38 adjacent to a window, which the present invention has been mounted in. Screw down cable clamp[s] 22 can be installed onto safety lanyard 21 and clamped. Each screw down cable clamp 22 alone would be strong enough to support the weight of the present invention. More than one screw down cable clamp 22 uses redundancy to assure that the present invention does not fall. The other end of safety lanyard 21 not attached to frame 1 is also looped back onto itself, and secured in that position with a cable ferrule 28, and can be used to attach lanyard to a heavy object that exists indoors. By feeding a length of safety lanyard 21 through the loop not attached to frame 1; a large adjustable loop can be created which can be attached to a heavy object indoors. With the screw down cable clamp[s] 22 attached to interior wall support member[s] like stud[s] or header[s], and the safety lanyard 21 attached to a heavy object indoors; the possibility of the present invention falling to the ground outdoors is extremely unlikely. Safety lanyard 21 can be any length. The preferred embodiment for the safety lanyard 21 is stainless steel cable with crimped cable stops 29, ferrules 28, and screw down cable clamps 22 which is of sufficient length to engage indoor objects that may be several feet away from a window. Safety lanyard 21 can be manufactured by cutting predetermined lengths of metal cable. A loop can be created by folding one of the ends of said lengths of metal cable onto rest of said length then permanently attaching said end to said rest of length with a ferrule 28.

Figure 7:
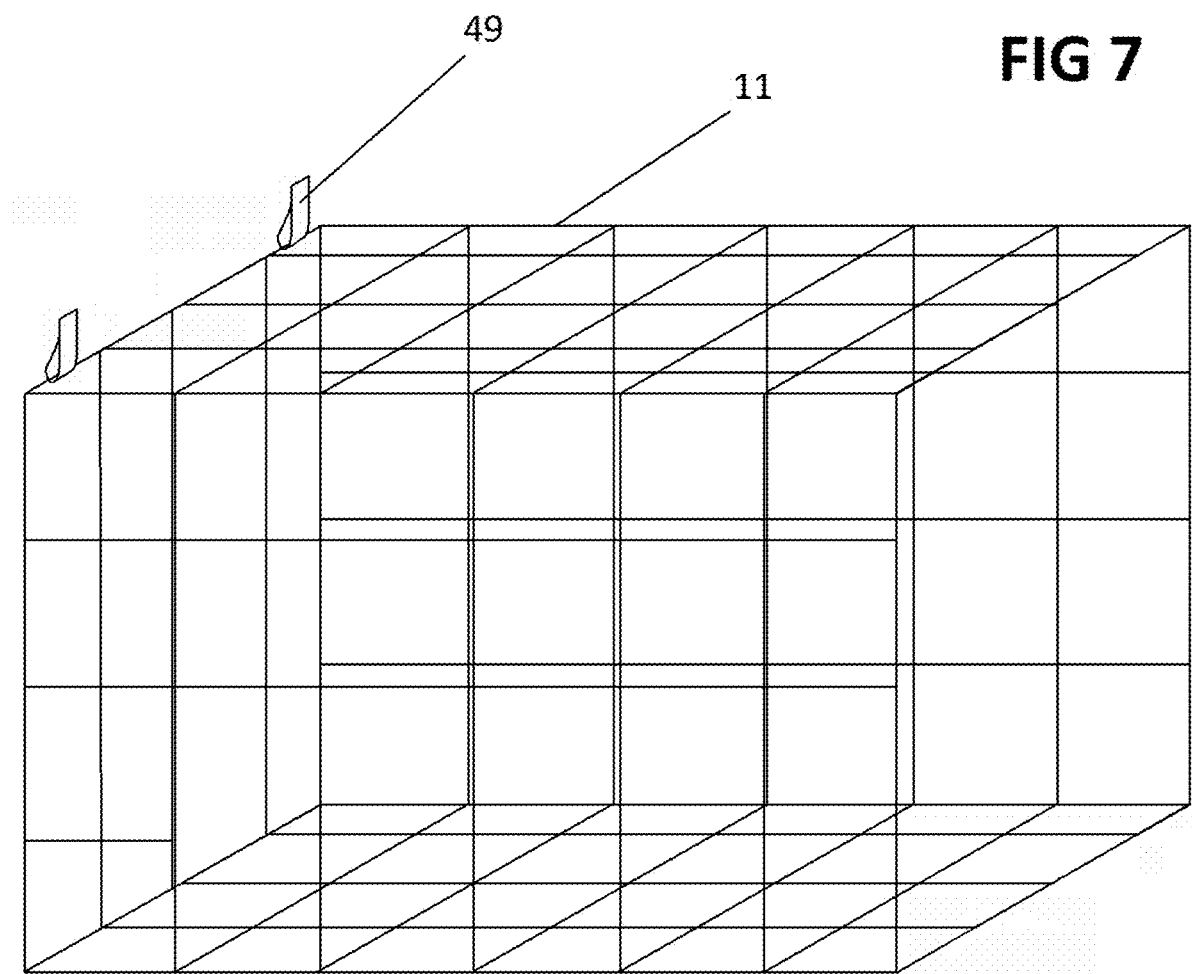

With regard to FIG. 7 which depicts a perspective view of enclosure 11. All parts of the present invention not shown in FIG. 7 were deliberately omitted to show enclosure 11. Enclosure 11 is a hollow cuboid shaped interlaced network of cables or ropes with one opened end. Enclosure 11 is attached to frame 1 and outdoor shelf 7 by attachment cable 42. Enclosure 11 can be attached to separation bar 15 by generic attachment straps 49 which are equipped with hook and loop fastening material 32. Pets can enter, and exit enclosure 11 through a barrier door 24. Enclosure 11 can keep pet contained within and allows said pet a free view of the outdoor world. The preferred embodiment for enclosure 11 is thin, stainless steel cable interlaced in such a way as to have each strand a fixed distance from each other so as to create a mesh.

Figure 8:
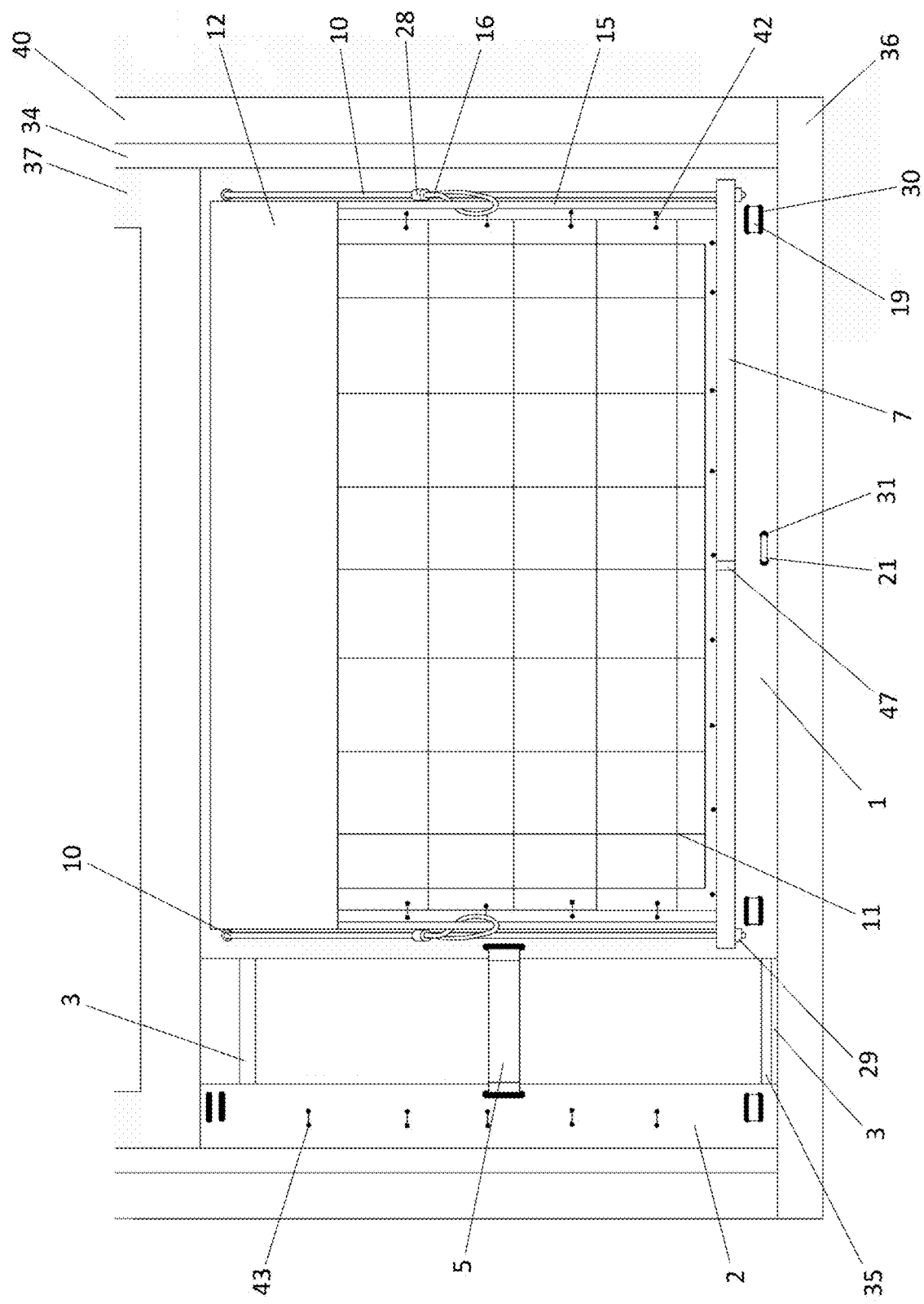

With regard to FIG. 8 which depicts an elevation view of present invention fitted into a common window as viewed from outdoors. All parts of the invention not shown in FIG. 8 were deliberately omitted to show certain aspects of present invention. Frame 1 engages a window sash channel 34, window sash 37, and window stool 35. Sash engagement flanges 6 at top end of frame 1 engage the indoor side of a window sash 37 when said window sash is brought down into contact with the top end of frame 1. Springs 4 seated inside holes at side end of frame 1 generate separation force between frame 1 and frame extension rods 3 which is transferred to frame extension 2. Frame extension 2 engages a window sash channel 34 and window stool 35. Frame extension retainer 5 attaches frame 1 to frame extension 2. Frame 1 has attachment holes 43 which facilitate attachment of enclosure 11 and barrier attachment strip 46 to frame 1 using attachment cable 42. Suspension cables 10 traverse through holes 31 in outdoor shelf 7 which permanently attach said outdoor shelf to, and suspend said outdoor shelf from frame 1. Suspension cables 10 are fitted with cable stops 29 which are larger in diameter than said suspension cables and the plurality of holes 31 through which said suspension cables traverse. Suspension cables 10 are fitted with cable stops 29 and ferrules 28, and separation bar retainer loop 16 which maintain fixed distances between objects through which said suspension cables traverse as well as couple the ends of said suspension cables together. Cable stops 29 prevent suspension cables 10 from sliding through the plurality of holes 31 in frame 1 and shelves (7 and 8) through which said suspension cables traverse. Outdoor shelf 7 and enclosure 11 are permanently attached to frame 1 so that the contents of said enclosure are afforded the securement provided by safety lanyard 21 and safety bar 18. Safety lanyard 21 can have additional securement provided by screw down cable clamp[s] 22. Safety bar 18 can be attached to frame 1 and frame extension 2 by safety bar attachment straps 19 traversing through slots 30. When outdoor shelf 7 is folded into a position of planar equality relative to frame 1, separation bar 15 simultaneously collapses a canopy 12 toward frame 1 and enclosure 11 toward outdoor shelf 7. When outdoor shelf 7 is opened into a perpendicular position relative to frame 1, separation bar 15 simultaneously extends a canopy 12 away from frame 1 and enclosure 11 away from outdoor shelf 7. Canopy 12 prevents a majority of sun and precipitation from falling on enclosure 11. Suspension cables 10 allow outdoor shelf 7 to open downward into a level position. Frame 1, frame extension 2, and outdoor shelf 7 have attachment holes 43 for attachment of enclosure 11 and barrier attachment strip 46 by attachment cable 42. Outdoor shelf 7 can be held in a position of planar equality with frame 1 by inserting shelf retainer 27 into a cable slot 47 in said shelf. Window casing 40 is decorative material which borders a window. Frame 1 and frame extension 2 are seated on window sill 36.

Figure 9:
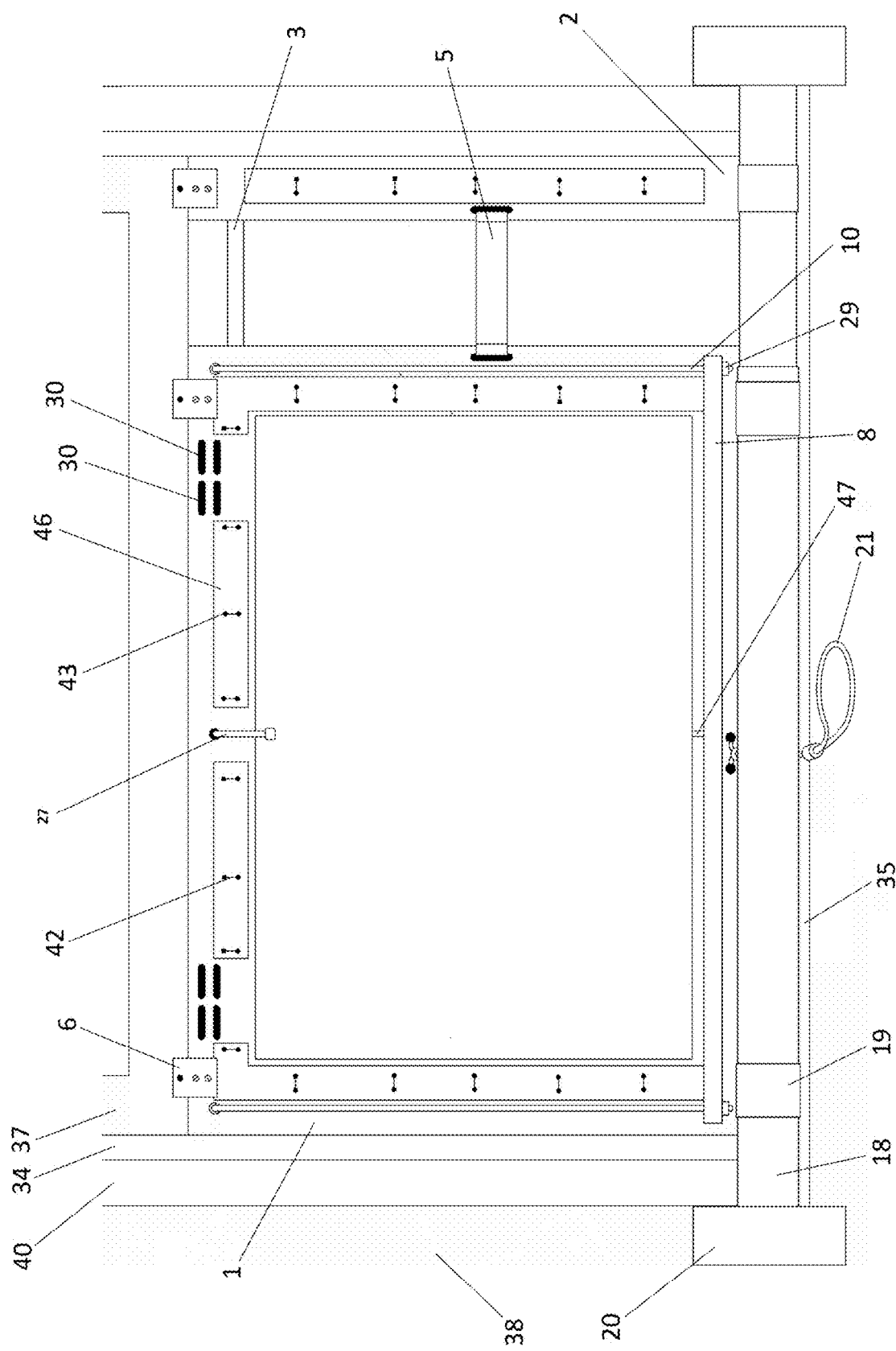

With regard to FIG. 9 which depicts an elevation view of present invention fitted into a common window as viewed from indoors. All parts of the invention not shown in FIG. 9 were deliberately omitted to show certain aspects of present invention. Present invention can be mounted into an opened window by inserting frame 1 into a window sash channel 34 then compressing frame extension 2 toward frame 1 then aligning frame extension 2 with the opposite window sash channel 34 which frame 1 has been inserted into. After frame extension 2 is aligned with said opposite window sash channel; said compression can be released and frame 1 and frame extension 2 will be pushed apart, and frame extension 2 will insert into said opposite window sash channel by the urging of springs 4 pushing frame extension rods 3. After frame 1 and frame extension 2 are seated in opposite window sash channels 34; frame 1 and frame extension 2 can be pushed downward until bottom ends of frame 1 and frame extension 2 are seated on window sill 36. After frame 1 and frame extension 2 are seated on window sill 36; window sash 37 can be pushed down until it is in contact with the top end of frame 1 and sash engagement flanges 6. Threaded fasteners 51 can be used to attach sash engagement flanges 6 to window sash 37. After frame 1 and frame extension 2 are in contact with window stool 35, properly seated in window sash channels 34, seated on window sill 36, and window sash 37 is engaged by sash engagement flanges 6; safety bar 18 can be engaged. Safety bar ends 20 can engage an interior wall 38 by holding the properly length adjusted safety bar 18 against an interior wall 38 around the same level as slots 30 which safety bar attachment straps 19 traverse through, then wrapping all three safety bar attachment straps 19 under then over safety bar 18 back toward the outdoors. After safety bar attachment straps 19 are wrapped around safety bar 18, safety bar 18 can be brought to its closest position relative to frame 1 and frame extension 2 by pushing ends of safety bar attachment straps 19 toward the outdoors until they resist any tighter wrapping then attaching hook and loop fastening material 32 together. After safety bar 18 is at its closest position relative to frame 1 and frame extension 2, and properly wrapped with safety bar attachment straps 19; the safety bar ends 20 engage interior wall 38 which prevents present invention from moving toward the outdoors. Safety lanyard 21 can attach present invention to various attachment points which exist in the indoors by screw down cable clamps 22 and/or a loop at one end of said safety lanyard. Frame extension retainer 5 attaches frame 1 to frame extension 2. Window casing 40 is decorative material which borders a window. Indoor shelf 8 can be removably attached to frame 1 for any reason. Frame 1 and frame extension 2 have attachment holes 43 for barrier attachment strip 46 and enclosure 11 to be attached to frame 1 by attachment cable 42. Barrier 23 can be attached to frame 1 via barrier attachment strips 46 which are attached to frame 1 by attachment cable 42. Barrier extension 25 can be attached to frame extension 2 by a barrier attachment strip 46 which is attached to frame extension 2 by attachment cable 42. Barrier extension 25 can be attached to barrier 23 by hook and loop fastening material 32. Barrier extension 25 is equipped with bristles 41 which traverse any spaces between barrier extension 25 and window apparatus preventing insects from traversing through said spaces. Suspension cables 10 allow indoor shelf 8 to swing downward into a level position. Suspension cables 10 are a flexible attachment point between frame 1 and shelves (7 and 8). Shelves (7 and 8) can be folded, toward frame 1 into a position of planar equality with frame 1 and held in that position by a shelf retainer 27 which can be inserted into cable slots 47 on said shelves. Indoor shelf 8 is removably attachable from present invention by sliding suspension cables 10 into and out of cable slots 47. Suspension cables 10 and shelf retainer 27 have cable stops 29 at predetermined locations which can be seated in cable stop seats 52 which exist at one end of cable slots 47.

With regard to FIGS. 8 and 9 which depict two different elevation views of the present invention. All parts of the invention not shown in FIGS. 8 and 9 were deliberately omitted to show certain aspects of present invention. Attachment cable 42 is fed through an attachment hole 43 from the indoors toward the outdoors until a cable stop 29 at one of its ends is in contact with the indoor side of frame 1. Attachment cable 42 is then wrapped around the border of enclosure 11 which is closest to frame 1. Attachment cable 42 is then threaded through an attachment hole 43 on frame 1 to the indoor side of frame 1. Attachment cable 42 is then threaded through holes in barrier attachment strip 46. Attachment cable 42 is then fed through another attachment hole 43 in frame 1 toward the outdoor side of frame 1. Attachment cable 42 is then wrapped around another section of the enclosure 11 closest to frame 1 and fed through another attachment hole 43 toward the indoor side of frame 1 again. This process is repeated until enclosure 11 and barrier attachment strip 46 are completely attached to frame 1. Another attachment cable 42 is threaded through an attachment hole 43 on frame extension 2 toward the indoor side of frame extension 2 until a cable stop 29 at one of its ends is in contact with frame extension 2. Attachment cable 42 is then threaded through holes in barrier attachment strip 46. Attachment cable 42 is then fed through another attachment hole 43 in frame extension 2 toward the outdoor side of frame extension 2. Attachment cable 42 is then fed through another attachment hole 43 in frame extension 2 toward the indoor side of frame extension 2 and fed through more holes in barrier attachment strip 46. This process is repeated until barrier attachment strip 46 is completely attached to frame extension 2. The process of attaching enclosure 11 and barrier attachment strip 46 to frame 1 and attachment strip 46 to frame extension 2 is simple, inexpensive, effective, and repeatable which facilitates easy manufacture and the possibility for the user of the invention to replace enclosure 11 and/or barrier attachment strip 46. The preferred embodiment for attachment cable 42 is a length of thin stainless steel cable with a cable stop 29 on one end and is prevented from fraying on the other end by a certain manufacturing process.

Figure 10:
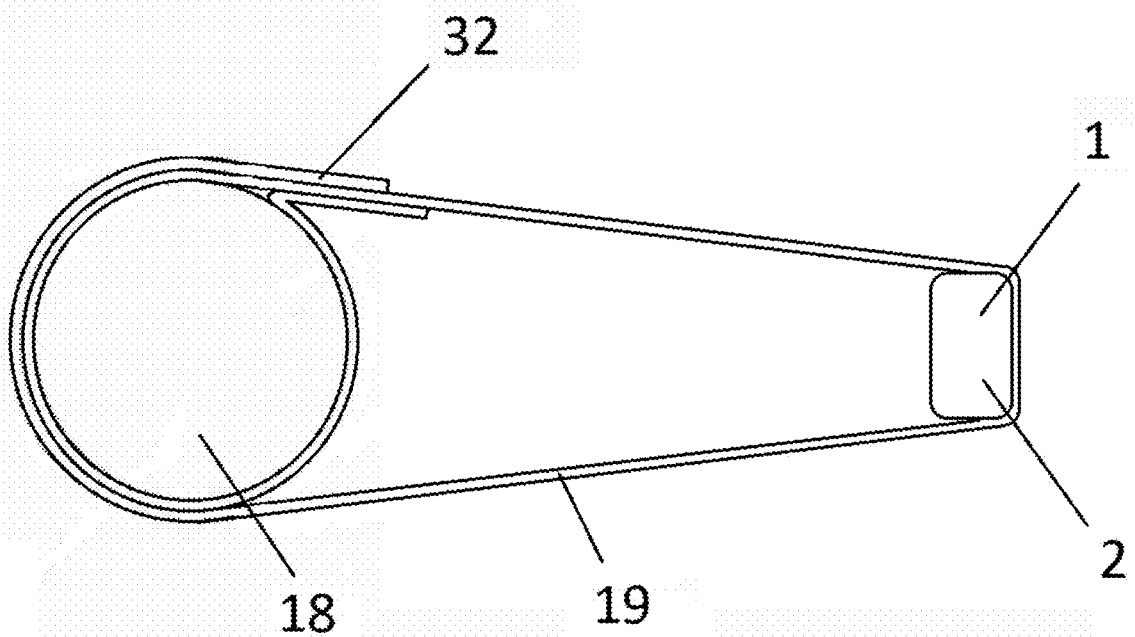
Figure 11:
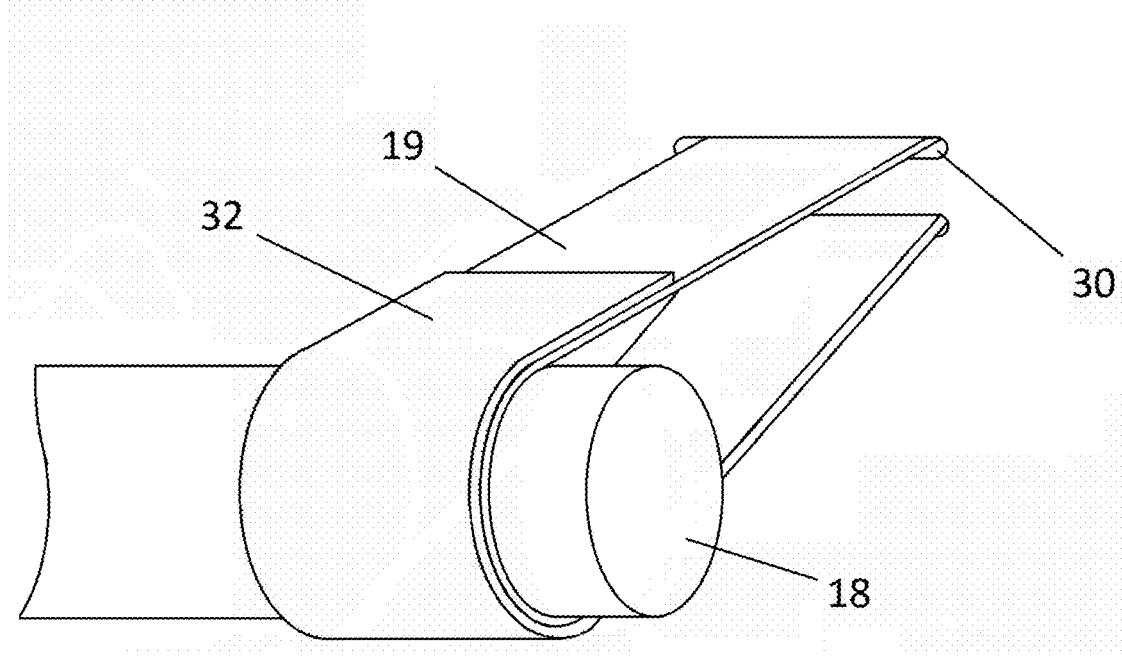

With regard to FIGS. 10 and 11 which depict elevation and perspective views of safety bar attachment strap 19. Safety bar attachment strap 19 can be folded onto itself and sewn in such a way as to create a loop into which the safety bar 18 fits. Safety bar attachment strap 19 has hook and loop fastening material 32 attached at predetermined locations to facilitate attaching safety bar attachment strap 19 onto itself. Safety bar attachment strap 19 attaches safety bar 18 to frame 1 or frame extension 2. Safety bar attachment strap 19 traverses from the safety bar 18 through one slot 31 in frame 1 or frame extension 2 from indoors to outdoors, then from outdoors to indoors through an adjacent slot 30 in frame 1 or frame extension 2 and returns to safety bar 18, to wrap around it for securement with hook and loop fastening material 32. Said wrapping of the safety bar attachment strap 19 around safety bar 18 provides additional securement. The preferred embodiment of the safety bar attachment strap 19 is woven fabric material that is strong and lightweight and has hook and loop fastening material 32 sewn on. Safety bar attachment strap 19 can be manufactured by cutting predetermined lengths of woven fabric material then sewing hook and loop fastening material 32 onto said lengths at predetermined locations. After or before hook and loop material 32 has been sewn onto said lengths of woven fabric material;

loops can be created in said lengths by folding an end of said woven fabric material onto itself and permanently attaching it in that position by sewing. Said loops can accommodate the insertion of safety bar 18.

Figure 12:
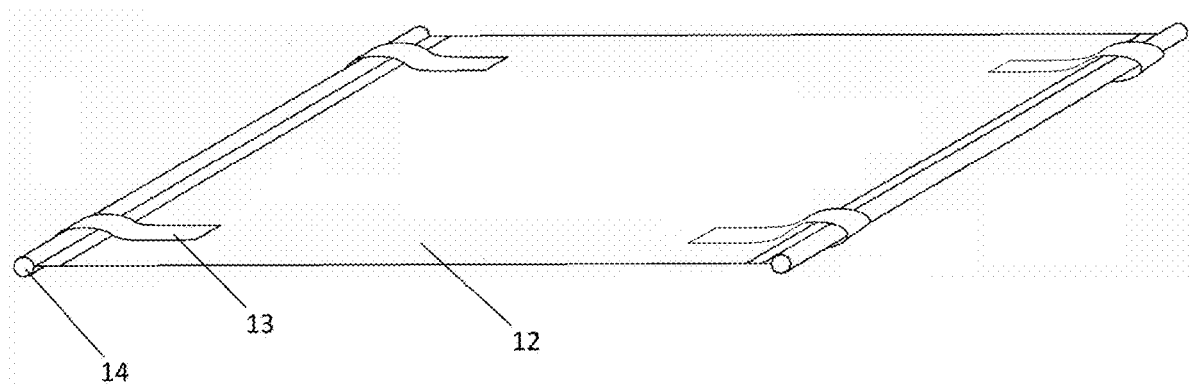

With regard to FIG. 12 which depicts a perspective view of canopy 12. Canopy 12 can be attached onto itself at two ends in such a way as to create loops at opposite ends of said canopy which permit canopy rods 14 to be inserted into said loops at opposite ends of canopy 12. Canopy attachment strap 13 is equipped with hook and loop fastening material 32 and can wrap around any object and be reattached to itself. Canopy 12 can be easily attached and unattached from rest of invention which facilitates easy manufacture and the possibility for user of invention to replace canopy 12. One end of canopy 12 has canopy attachment straps 13 which traverse through adjacent slots 30 in frame 1 and can attach canopy 12 to frame 1. The other end of canopy 12 has canopy attachment straps 13 which wrap around separation bar 15 and can attach canopy 12 to separation bar 15. The preferred embodiment for canopy 12 is water resistant fabric. The preferred embodiment for canopy rod 14 is fiberglass rod. Canopy 12 can be manufactured by cutting fabric material to a predetermined size and cutting rigid rod material to a predetermined length then sewing said fabric material onto itself at predetermined locations to create loops. After this; canopy attachment straps 13 are sewn onto said fabric material at predetermined locations. Finally; rigid rods are inserted into said loops in fabric material.

Figure 13:
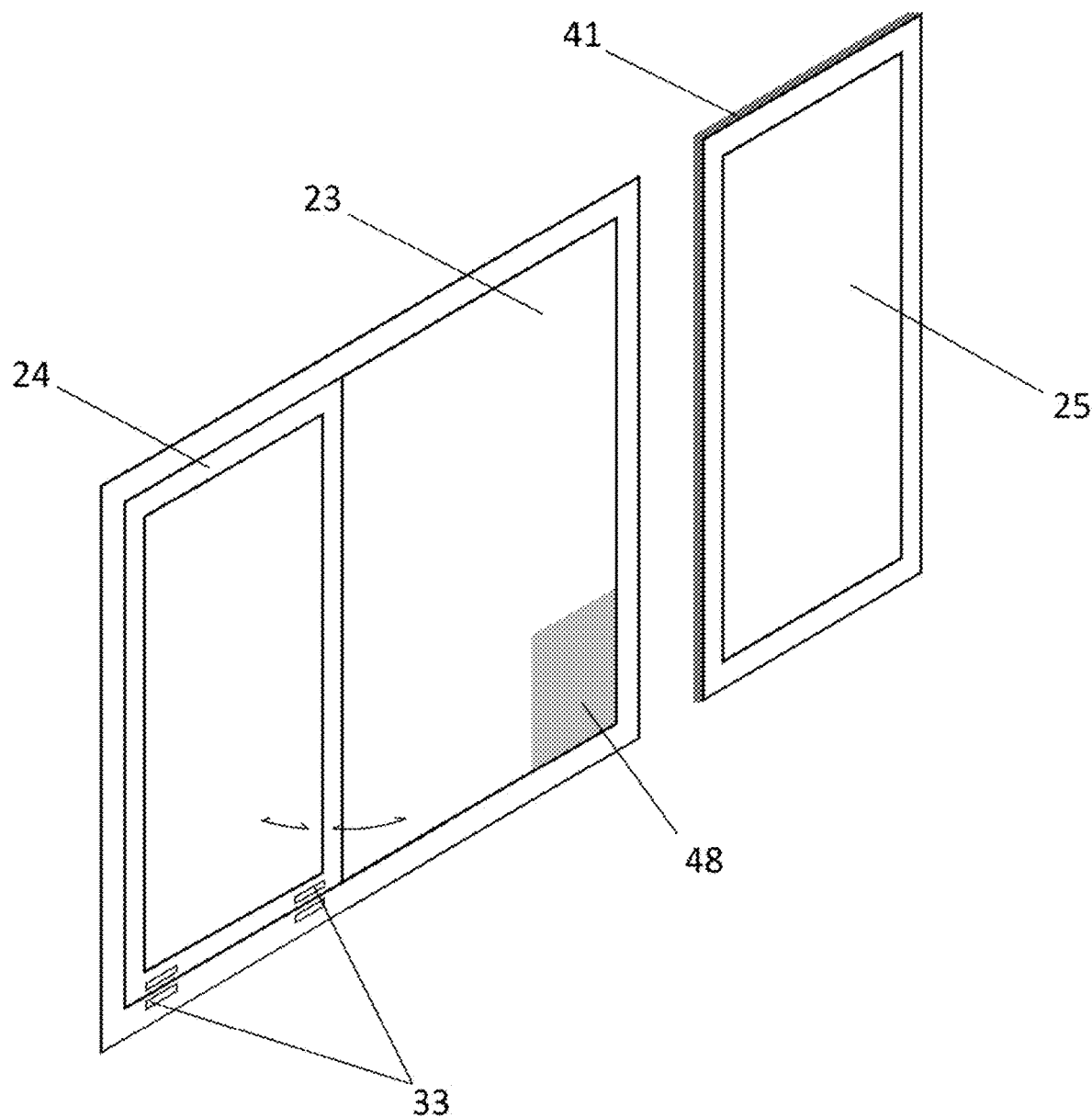

With regard to FIG. 13 which depicts a partial perspective view of barrier 23 barrier extension 25, and barrier door 24. Barrier 23 barrier extension 25, and barrier door 24 prevent insects form traversing between the outdoors and indoors with mesh screen material 48. Barrier 23 barrier extension 25, and barrier door 24 can be attached to frame 1 and frame extension 2. Barrier 23 has an opening for a vertically swinging barrier door 24 which can swing toward the outdoors and indoors. Said opening in barrier 23 is situated as far as possible from where barrier extension 25 attaches to barrier 23 to facilitate a range of attachment locations for barrier extension 25 to attach to barrier 23. Barrier door 24 can be removably attached at its upper border to barrier 23 with hook and loop fastening material 32. Barrier door 24 has bristles 41 around its borders which fill the space between barrier door 24 and rest of barrier 23 to repel insects. Barrier door 24 is held closed by magnets 33 at bottom of barrier door 24 and bottom of opening in barrier 23 similar to the invention by Sronce 4754797 Jul. 5, 1998. Barrier 23 can allow air to traverse between the outdoors and indoors. Barrier 23, barrier door 24, and barrier extension 25 have woven fabric material borders which prevents mesh screen material 48 from being torn and provides a strong and flexible surface to which hook and loop fastening material 32 can be attached. The woven fabric material borders of barrier 23 have hook and loop fastening material 32 sewn to them at predetermined locations which are used to attach barrier 23 to barrier attachment strip 46 and barrier extension 25. The woven fabric material borders of barrier extension 25 have hook and loop fastening material 32 sewn to them at predetermined locations which are used to attach barrier extension 23 to barrier attachment strip 46 and barrier 23. Barrier extension 25 prevents insects from traversing space between frame 1 and frame extension 2. Barrier extension 25 has bristles 41 at its upper and lower borders. Bristles 41 fill the spaces between barrier extension 25 and window apparatus. Barrier extension 25 attaches to frame extension 2 with barrier attachment strip 46, and barrier 23 with hook and loop fastening material 32. One embodiment for barrier 23 can be mesh screen material 48 commonly found in windows to repel insects, having an opening to accommodate a vertically swinging barrier door 24, also having woven fabric material attached around all borders, and said woven fabric material having hook and loop fastening material 32 and magnets 33 attached to it at predetermined locations. One embodiment for barrier extension 25 can be mesh screen material 48 commonly found in windows to repel insects having woven fabric material attached around all borders, and said woven fabric material having hook and loop fastening material 32 attached to it at predetermined locations. One embodiment for barrier door 24 can be mesh screen material 48 commonly found in windows to repel insects, having woven fabric material strips attached around all borders, and said woven fabric material strips having hook and loop fastening material 32 and magnets 33 attached to it at predetermined locations. Another embodiment for barrier 23, barrier extension 25, and barrier door 24 can be non-permeable material, instead of the mesh screen material 48 mentioned in the embodiments above, which prevents traversal of air for the purpose of temperature control. Barrier 23, barrier door 24, and barrier extension 25 can be manufactured by cutting hook and loop fastening material 32, woven fabric material strips, magnets 33, and mesh screen material 48 or non-permeable material to predetermined sizes and lengths; then sewing these materials together with a predetermined methodology.

Figure 14:
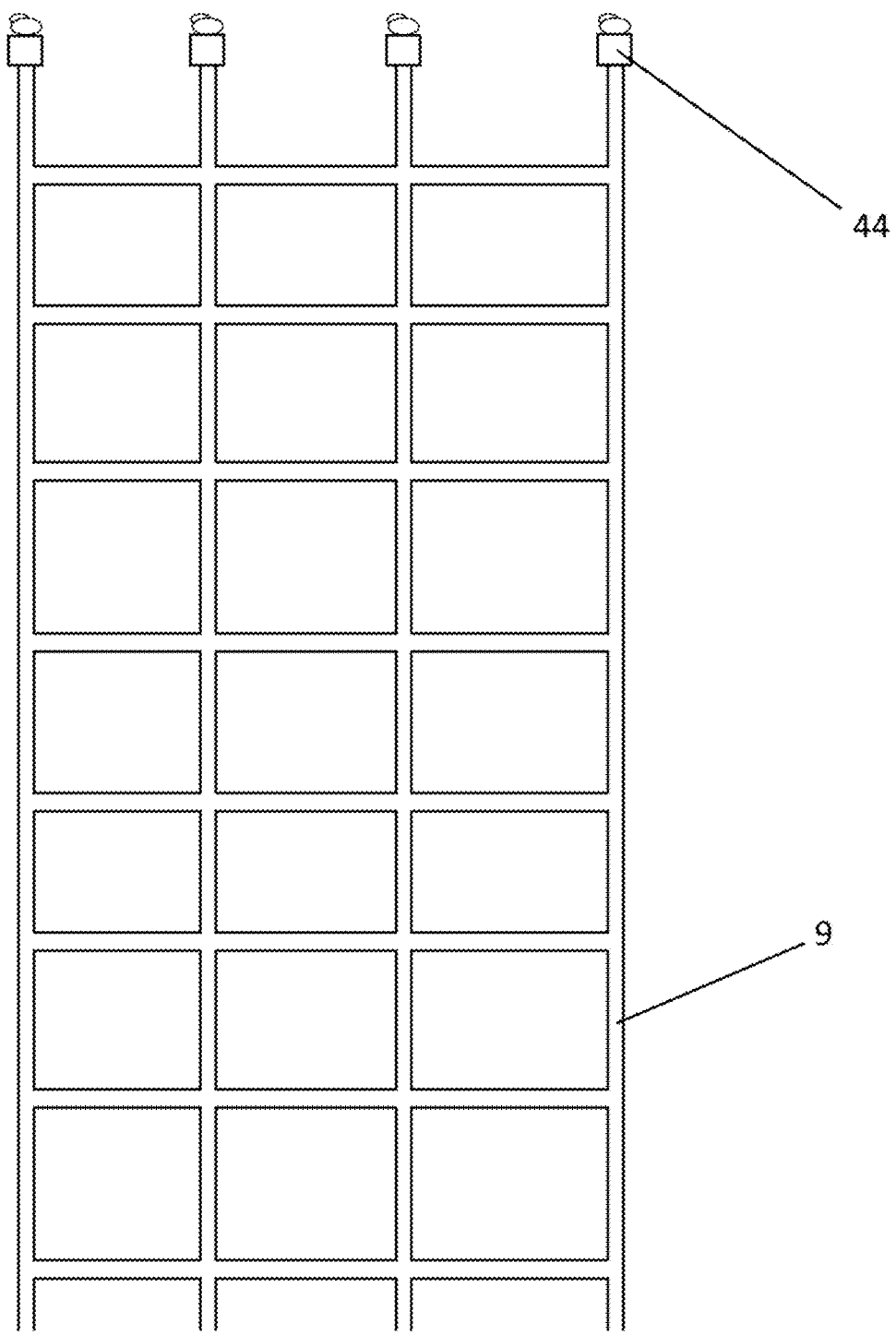

With regard to FIG. 14 which depicts an elevation view of climbing net 9. Climbing net 9 affords pets the opportunity to climb onto indoor shelf 8 from any surface which is lower. Climbing net 9 attaches to indoor shelf 8 with climbing net locks 44 which are inserted through climbing net holes 45 in indoor shelf 8, then slid to the ends of slots in climbing net holes 45. The slots in climbing net holes 45 are toward the indoors. The climbing net locks 44 are too large to fit through the slots in climbing net holes 45 and the climbing net 9 is attached indoor shelf 8 with this methodology. One embodiment for climbing net 9 is thin rope material fashioned in such a way as to have each strand a fixed distance from each other so as to create an interlaced network with large openings, and having a certain number of ends which have a larger diameter than said rope material. Climbing net 9 can be manufactured by weaving thin ropes together, then fixing them to each other at predetermined distances so as to create a mesh with large openings, then cutting this mesh to size, then creating the larger diameter ends by attaching tubular material at predetermined locations around said rope material or by simply tying said ends in knots.

Figure 15:
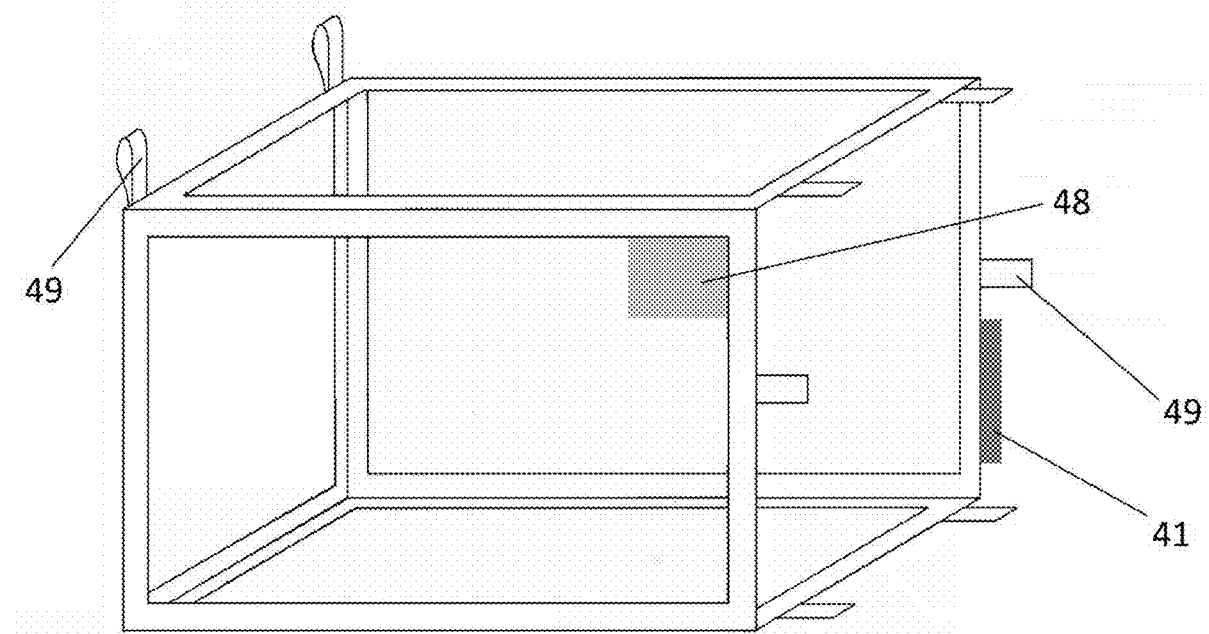

With regard to FIG. 15 which depicts a perspective view of the outdoor screen 26. Outdoor screen 26 is a hollow cuboid shape of mesh screen material 48 which has an opened side. Said opened side is bordered with frame 1. Outdoor screen 26 is attached to enclosure 11 having generic attachment straps 49 which have hook and loop fastening material 32. Generic attachment straps 49 have been attached to outdoor screen 26 at predetermined locations. Outdoor screen 26 fits inside enclosure 11. Outdoor screen 26 has bristles 41 around all edges which come in contact with frame 1 which prevent insects from traversing through any spaces between outdoor screen 26 and frame 1. Barrier 23 is unnecessary for insect repulsion when outdoor screen 26 is attached to present invention. The preferred embodiment for outdoor screen 26 is mesh screen material 48 commonly found in windows to repel insects which has been fashioned in such a way as to resemble a cuboid shape with one opened end, having strips of woven fabric material which is attached to all edges of said cuboid shape also having generic attachment straps 49 attached to said strips. Outdoor screen can be manufactured by cutting mesh screen material 48 into two rectangular shapes of different sizes, then sewing pre-cut lengths of woven fabric material strips to predetermined locations on said rectangular shapes which have had bristled material 41 and generic attachment straps 49 sewn onto said woven fabric material strips at predetermined locations. After mesh screen material 48 has been assembled with woven fabric material strips, said larger rectangular shape is folded and sewn onto itself so as to create the floor, side walls, and ceiling of outdoor screen 26. Then the borders of said smaller rectangular shape are sewn onto said larger rectangular shape so as to create the outer wall of said cuboid shape. The net result of this process yields a cuboid shape of mesh screen material 48 which has an opening at one end.

Figure 16:
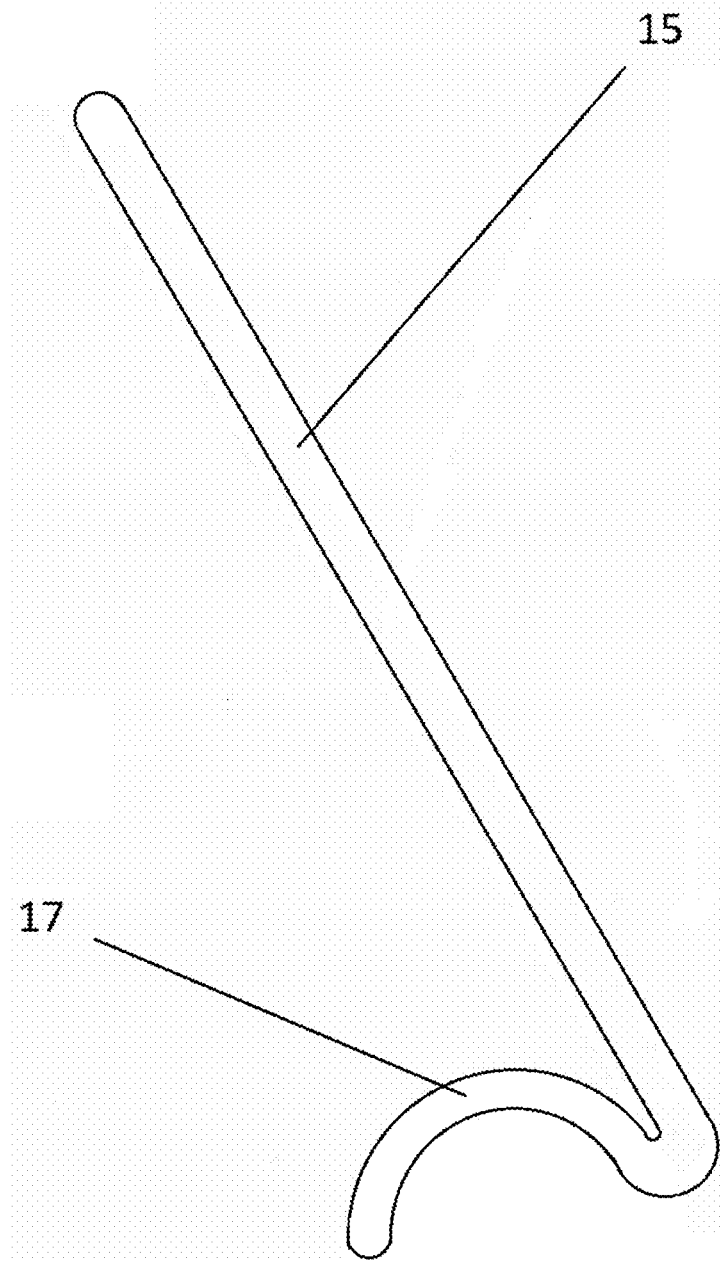

With regard to FIG. 16 which depicts an elevation view of separation bar bend 17. Separation bar bend 17 is a crescent shaped bend at the ends of separation bar 15. This crescent shape acts as a flexible attachment point between outdoor shelf 7 and separation bar 15 which allows separation bar 15 to move independently of outdoor shelf 7, yet remain attached to outdoor shelf 7. The separation bar bend 17 retains the ends of separation bar 15 in holes 31 through outdoor shelf 7 when the distance between separation bar retainer loop 16 and outdoor shelf 7 increases to its maximum distance after outdoor shelf 7 is opened to a perpendicular position relative to frame 1. The angle that separation bar 15 requires to exit outdoor shelf 7 is never achieved because the separation bar retainer loop 16 prevents this. The separation bar bend 17 solves the problem of expending resources needed to create and attach hinges. Separation bar can be manufactured by cutting lengths of thin rod material into predetermined lengths then bending said lengths of rod material at predetermined locations.

Figure 17:
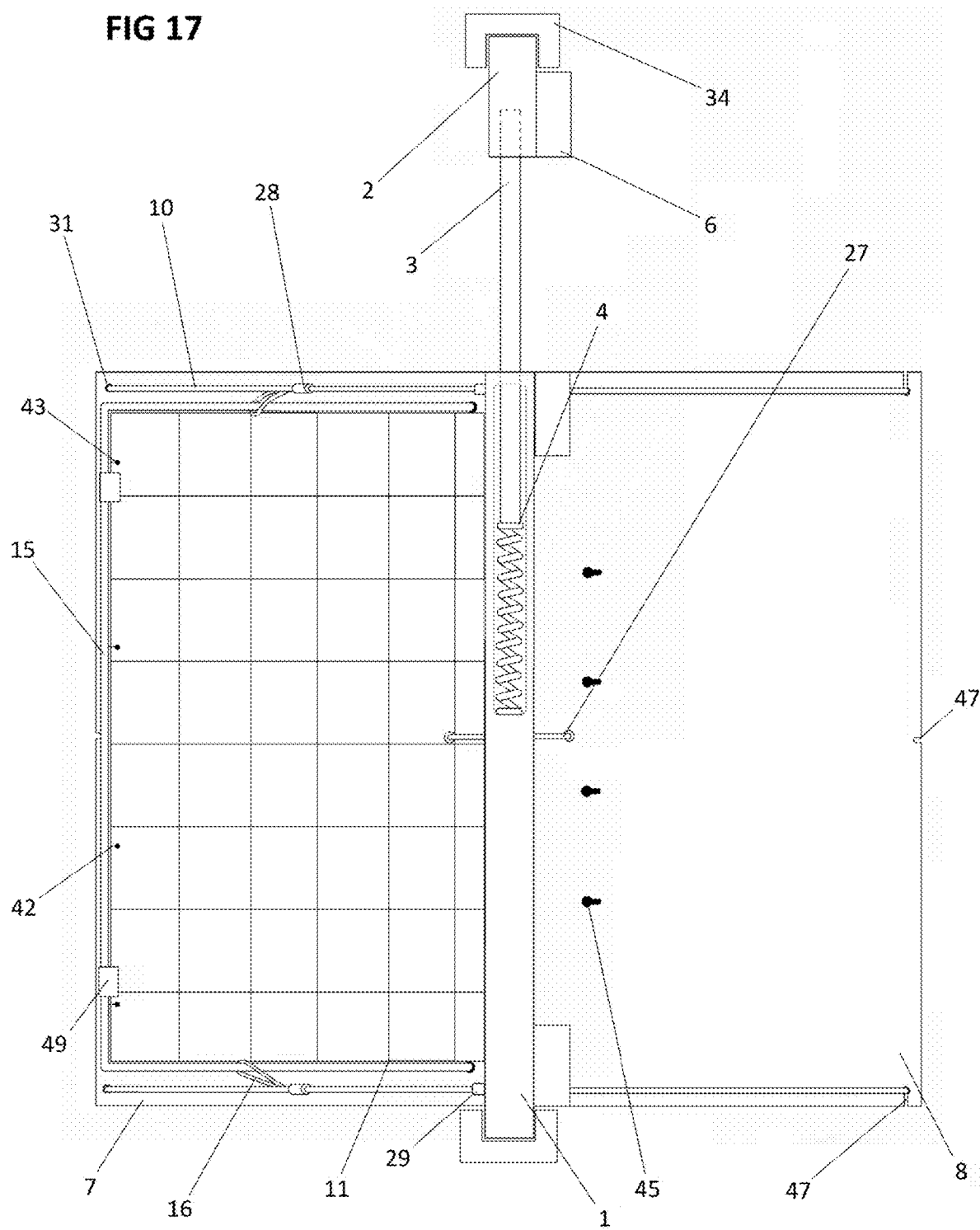

With regard to FIG. 17 which depicts a plan view of present invention. All parts of the invention not shown in FIG. 17 were deliberately omitted to show certain aspects of present invention. Frame 1 has sash engagement flanges 6 which engage a window sash 37 to prevent movement toward the outdoors at upper end of frame 1. Springs 4 are embedded within holes in side end of frame 1. Frame extension rods 3 transfer expansion force generated by springs 4 from frame 1 to frame extension 2 which expand present invention into sash channels 34. When expanded into opposing sash channels 34, movement of present invention in an outdoor or indoor direction is prevented. Shelves (7 and 8) are supported by suspension cables 10. Suspension cables 10 act as flexible attachment points between shelves (7 and 8) and frame 1. Suspension cables 10 act as hinges between shelves (7 and 8) and frame 1. Suspension cables 10 have various cable stops 29 along their length which are fixed at predetermined distances between them, and said fixed distances prevent shelves (7 and 8) from opening to angles of greater than ninety degrees relative to frame 1. Suspension cables 10 are strung through various holes 31 in frame 1 and shelves (7 and 8). The ends of each suspension cable 10 are coupled with ferrules 28. A separation bar retainer loop 16 is attached to each suspension cable 10 by a ferrule 28. Enclosure 11 can be in close proximity to outdoor shelf 7. Enclosure 11 can be attached to separation bar 15 with generic attachment straps 49 which are equipped with hook and loop fastening material 32. Enclosure 11 can be attached outdoor shelf 7 and frame 1 with attachment cable 42. Shelf retainer 27 is fitted into cable slots 47 through shelves (7 and 8) to hold them in a position of planar equality relative to frame 1. Indoor shelf 8 has climbing net attachment holes 45 which allow climbing net locks 44 to fit through and slid toward the indoors. The climbing net locks 44 cannot fit through the slots in the climbing net attachment holes 45 which facilitates removable attachment between climbing net 9 and indoor shelf 8. Outdoor shelf 7 can have attachment holes 43 at predetermined locations which enclosure 11 can be attached to by attachment cables 42. Indoor shelf 8 has cable slots 47 which facilitate suspension cables 10 to be removably attached to indoor shelf 8 which facilitates removable attachment of indoor shelf 8 to frame 1.

Figure 18:
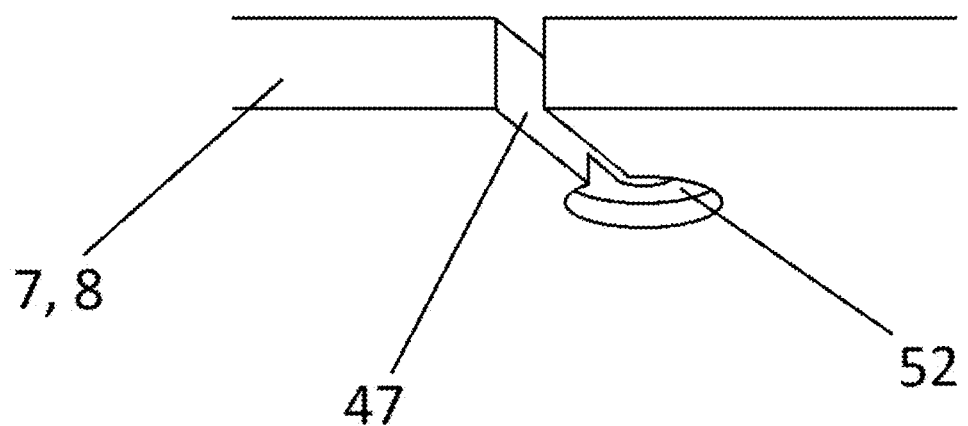

With regard to FIG. 18 which depicts a perspective view of a cable slot 47. Shelves (7 and 8) can have cable slots 47 at predetermined locations. Suspension cable 10 or shelf retainer 27 can be inserted into cable slot 47 and moved to the end of cable slot 47. When suspension cable 10 or shelf retainer 27 is at the end of cable slot 47, cable stop 29 can be seated into a cable stop seat 52. When seated in cable stop seat 52, cable stops 29 on suspension cable 10 retain suspension cable 10 in cable slot 47. When seated in cable stop seat 52, cable stop 29 on shelf retainer 27 retains said shelf retainer in cable slot 47.

With regard to FIG. 19 which depicts an elevation view of a cable stop 29 on a suspension cable 10 or shelf retainer 27 which has been fitted into a cable slot 47. Suspension cable 10 can be inserted laterally from the side of indoor shelf 8 as arrow A indicates then cable stop 29 can be seated in cable stop seat 52 as arrow B indicates.

Glossary

1. Frame Can be a planarly shaped object. The preferred placement for frame 1 is vertically in an opened window with sash engagement flanges 6 at the top end of frame 1. Frame 1 engages a window stool 35 to prevent movement of frame 1 toward the indoors. Frame 1 engages a window sash channel 34 to prevent inward and outward movement of frame 1. Frame 1 has numerous slots 30 and holes 31 which provide attachment points for many other parts of the present invention. Frame 1 has sash engagement flanges 6 attached which engage the interior side of a window sash 37. One of these sash engagement flanges 6 is near the window sash channel 34 for the purpose of engaging window sash 37 at its strongest point against outward movement. Frame 1 acts the same way as a suspension bridge's pylon for weight bearing support of suspension cables 10. Preferred embodiment for frame 1 is planarly shaped water-resistant wood which is easily obtained and machined.

2. Frame Extension Can be a planarly shaped object which engages the opposite window sash channel 34 that frame 1 engages to prevent inward and outward movement at frame extension 2. Frame extension 2 is attached to frame 1 by frame extension retainer 5. Frame extension 2 has a sash engagement flange 6 at its top which engages a window sash 37 near the window sash channel 34 for the purpose of engaging window sash 37 at its strongest point against outward movement. Frame extension 2 has numerous slots 30 and holes 31 which provide attachment points for many other parts of the present invention. Preferred embodiment for frame extension 2 is planarly shaped water-resistant wood which is easily obtained and machined.

3. Frame Extension Rod Can have one end inserted into a hole 31 in side end of frame 1. Frame extension rod 3 slides into and out of said hole. The other end of frame extension rod 3 is fixed within a hole in frame extension 2. Frame extension rod 3 transfers expansion force from a spring 4. This force transference is similar to a paper dispenser rod assembly of invention 2492728 by Balz Dec. 27, 1949. Preferred embodiment for frame extension rod 3 is fiberglass rod which is lightweight and strong.

Frame extension rod 3 can be manufactured by cutting predetermined lengths of rod material and drilling a small hole for attachment to frame extension 2 with a threaded fastener or smaller rod material.

4. Spring A coiled spring seated in holes 31 in frame 1. Spring 4 exerts separation force between frame 1 and frame extension rod 3. Preferred embodiment for spring 4 is steel. British Patent 792 by Tradwell shows a coiled spring.

5. Frame Extension Retainer Flexibly attaches frame 1 to frame extension 2. Distance between frame 1 and frame extension 2 can be adjusted. Loops through slots 30 in frame 1 and frame extension 2 can attach to itself with hook and loop fastening material 32. Preferred embodiment for frame extension retainer 5 is a woven fabric material strap which exhibits high tolerance for tension force, having hook and loop fastening material 32 sewn on at predetermined locations.

Frame extension retainer 5 can be manufactured by cutting a length of woven fabric material strap into shorter lengths then sewing hook and loop fastening material 32 onto said strap material at predetermined locations.

6. Sash Engagement Flange Engages indoor side of a window sash 37 to prevent movement toward the outdoors at top end of frame 1 and frame extension 2. When there is downward force (weight) applied to outdoor shelf 7, suspension cables 10 transfer this force to upper end of frame 1. Then upper end of frame 1 transfers this force towards the outdoors. The sash engagement flange 6 transfers this force to the window sash 37, which prevents the top of frame 1 from moving toward the outdoors. Sash engagement flange 6 can have a hole 31 for a threaded fastener 51 to pass through and attach sash engagement flange 6 to window sash 37. Preferred embodiment for sash engagement flange 6 is planarly shaped water-resistant wood which is easily obtained and machined.

Sash engagement flange 6 can be manufactured by cutting wood of a predetermined thickness into strips of a predetermined width then cutting said strips to predetermined lengths. Holes 31 can be drilled through said pieces.

7. Outdoor Shelf Provides a level surface upon which objects can sit. Has holes for suspension cables 10, and separation bar 15 to traverse through. Outdoor shelf has attachment holes 43 which are used to attach enclosure 11 to outdoor shelf 7. Outdoor shelf 7 can be folded into a position of planar equality with frame 1 then held there by inserting shelf retainer 27 into a cable slot 47 in outdoor shelf 7. Outdoor shelf 7 is supported by, and attached to frame 1, by suspension cables 10. Preferred embodiment for outdoor shelf 7 is planarly shaped water-resistant wood which is easily obtained and machined.

8. Indoor Shelf Can be a planar surface upon which objects can sit. Indoor shelf 8 has suspension cable slots 50 which facilitate suspension cables 10 to be removably attached to frame 1. Indoor shelf 8 can be folded into a position of planar equality with frame 1 then held there by inserting shelf retainer 27 into a cable slot 47 in indoor shelf 8. Indoor shelf 8 has keyhole shaped climbing net attachment holes 45 for climbing net 9. Preferred embodiment for outdoor shelf 8 is a planarly shaped water-resistant wood which is easily obtained and machined. Indoor shelf 8 can be removably attached to suspension cables 10 by inserting and removing suspension cables 10 from cable slots 47 that exist on indoor shelf 8

9. Climbing Net Provides pets a way to climb onto indoor shelf 8. Climbing net 9 has climbing net locks 44 at the top ends of each lengthwise strand which have a larger diameter than said lengthwise strands themselves. Climbing net attachment hole 43 is circular shaped with a slot radiating from one side of said hole toward the indoors. Climbing net locks 44 fit through the circular parts of climbing net attachment holes 43 through indoor shelf 8. Climbing net 9 can be attached to indoor shelf 8 by fitting climbing net locks 44 through climbing net attachment holes 43 through indoor shelf 8 then forcing climbing net 9 toward the indoors which forces the strands of climbing net 9 into the slot part of the climbing net attachment holes 43. Once the lengthwise strands equipped with climbing net locks 44 are seated at the end of the slot part of the climbing net attachment holes 43; the climbing net locks 44 cannot fit through the slot part of the climbing net attachment holes 43, which secures climbing net 9 to indoor shelf 8. Preferred embodiment for climbing net 9 is an interlaced structure of strong ropelike material which is woven together to establish even spaces between all strands having knots tied to certain ends which act as climbing net locks 44.

10. Suspension Cable Provides support for shelves (7 and 8) when their planes are in a perpendicular position relative to the plane of frame 1 while frame 1 is in a vertical position in an opened window. Suspension Cable 10 provides a flexible attachment point between shelves (7 and 8) and frame 1. Suspension cable 10 is fitted through holes 31 in frame 1, and shelves (7 and 8). Ends of suspension cable 10 are held together with a crimped ferrule 28, and fitted into a hole 31 in frame 1. This configuration reduces separation force between suspension cable 10 ends and allows suspension cable 10 to support more weight without ends sliding apart. Crimped cable stops 29 at fixed locations along suspension cable 10 prevent suspension cable 10 from sliding through frame 1 as well as prevent shelves (7 and 8) from opening to angles of greater than ninety degrees relative to frame 1. The flexibility of suspension cable 10 acts as a flexible attachment point between frame 1 and shelves (7 and 8) which allows the planes of said shelves to be at any angle relative to the plane of frame 1. One embodiment of suspension cable can be woven fabric strap material with loops sewn onto said strap which can have short lengths of rod material inserted into said loops creating impediments which cannot fit through slots which may exist in frame 1 and shelves (7 and 8) thus creating stops similar to cable stops 29. One embodiment of suspension cable can be rope material with tubular sleeves of a larger diameter than said rope material fixed at predetermined locations along said rope material with knots tied in said rope material, which cannot fit through holes in frame 1 or shelves (7 and 8) thus creating stops similar to cable stops 29. Preferred embodiment for suspension cable 10 is stainless steel cable.

11. Enclosure A hollow cuboid shaped structure with one opened side. Enclosure 11 can be comprised of a network of interlaced stranded material situated a predetermined distance from each other. Enclosure 11 is persistently secured to frame 1 and outdoor shelf 7 and keeps objects inside and allows them to be outdoors. Enclosure 11 is attached to frame 1 with attachment cable 42 which traverse through attachment holes 43 in frame 1. Enclosure 11 is attached to outdoor shelf 8 with attachment cable 42 which traverse through attachment holes 43 in outdoor shelf 8. Enclosure 11 is attached separation bar 15 with generic attachment straps 49. Enclosure 11 collapses between outdoor shelf 7 and frame 1 when outdoor shelf 7 is in a position of planar equality with frame 1. Enclosure 11 is stronger than mesh screen material 48 to prevent objects from escaping enclosure 11. Preferred embodiment for enclosure 11 is stainless steel cable.

12. Canopy Can be attached to separation bar 15, and frame 1 with canopy attachment straps 13. Canopy attachment straps 13 wrap around separation bar 15 and attach onto themselves via hook and loop fastening material 32. Canopy attachment straps 13 traverse through slots 30 in frame 1 and attach onto themselves via hook and loop fastening material 32. Canopy 12 is sewn onto itself at two opposite ends so as to form loops into which canopy rods 14 can be inserted. Said opposite ends which contain canopy rods 14 are pulled apart when outdoor shelf 7 is lowered to a level position and separation bar 15 simultaneously separates from outdoor shelf 7 and frame 1. Canopy 12 can be replaced. Canopy 12 can be customized with text, colors, or graphics. Canopy 12 provides shelter from sun and precipitation for enclosure 11. Preferred embodiment for canopy 12 is water-resistant fabric.

13. Canopy Attachment Strap A woven fabric material strap sewn to canopy which can have hook and loop fastening material 32 attached at predetermined locations. Preferred embodiment for canopy attachment strap 13 is woven fabric material which exhibits high tolerance for tension force and has hook and loop fastening material 32 sewn on.

14. Canopy Rod A rigid rod inserted into loops which have been fabricated at opposite ends of canopy 12. Canopy rod 14 provides rigidity to ends of canopy 12 which holds canopy flat when rods are pulled apart. Preferred embodiment for canopy rod 14 is fiberglass rod.

15. Separation Bar A bent rod which simultaneously extends front of enclosure 11 between separation bar 15 and outdoor shelf 7; and extends canopy 12 between separation bar 15 and frame 1. Separation bar 15 is tethered to suspension cables 10 by a separation bar retainer loop 16 which is a fixed distance away from outdoor shelf 8. Separation bar 15 is attached to top outdoor end of enclosure 11 with generic attachment straps 49. When the plane of outdoor shelf 7 is opened to a right angle relative to the plane of frame 1, the separation bar holds the top of enclosure 11 away from outdoor shelf 7 due to a fixed distance between separation bar 15 and outdoor shelf 7 which is maintained by separation bar retainer loop 16. The ends of separation bar 15 are also flexibly attached to the outdoor shelf 7 with separation bar bends 17. Preferred embodiment for separation bar 15 is stainless steel.

16. Separation Bar Retainer Loop A loop of material which loosely attaches separation bar 15 to suspension cable 10. Separation bar retainer loop 16 is attached to suspension cable 10 with a ferrule 28. Separation bar retainer loop 16 slides freely along a length of, and wraps around separation bar 15 which eliminates binding when outdoor shelf 7 and separation bar 15 are folded toward and opened away from frame 1. Separation bar retainer loop 16 provides a slidably attached anchor point to suspension cable 10 which facilitates variable angles between separation bar 15 and outdoor shelf 7. Separation bar retainer loop 16 holds separation bar 15 at a fixed angle relative to outdoor shelf 7 when the plane of outdoor shelf 7 is perpendicular to the plane of frame 1. Said fixed angle creates a separation between one section of separation bar 15 and outdoor shelf 7 and is less than the detachment angle of separation bar bend 17. Said separation provides ample interior space within enclosure 11 when outdoor shelf 8 is in a perpendicular position relative to frame 1. Preferred embodiment for separation bar retainer loop 16 is stainless steel cable.

17. Separation Bar Bend Crescent shaped bend at both ends of separation bar 15. Said bend retains separation bar 15 end in holes through outdoor shelf 7, yet allow separation bar 15 to move freely in relation to outdoor shelf 7. The only way that separation bar 15 can exit said holes is to be opened at an angle greater than a detachment angle of about ninety degrees in relation to outdoor shelf 7.

18. Safety Bar An object which can engage an interior wall 38. Safety bar 18 can have safety bar ends 20 which engage an interior wall 38 adjacent to an opened window into which the current invention has been mounted. Safety bar 18 is comprised of two hollow tubular sections with different diameters. The section with the smaller diameter fits inside the section with the larger diameter and slides into and out of the section with the larger diameter (like a telescope) which allows the overall length of safety bar 18 to be adjusted. Said adjustable length allows safety bar 18 to engage interior walls of windows which may have different widths. Preferred embodiment of safety bar 18 is lightweight, rigid, tubular material and can be cylindrically or non-cylindrically shaped. Safety bar 18 is similar to a cross bar from invention 7926424 by Thompson Nov. 20, 2007; however, safety bar 18 is adjustable.

19. Safety Bar Attachment Strap Woven fabric material which attach safety bar 18 to frame 1 and frame extension 2. Safety bar attachment strap 19 can have hook and loop fastening material 32 which is sewn onto safety bar attachment strap 19 and allows safety bar attachment strap 19 to attach to itself. Safety bar attachment strap 19 is used to hold static a minimum distance between a properly installed frame 1, frame extension 2, and a properly situated safety bar 19. When said minimum distance is achieved; frame 1 and frame extension 2 cannot move toward the outdoors, and the friction between safety bar ends 20 and the surfaces they are in contact with is maximized. Preferred embodiment for safety bar attachment strap 19 is woven fabric material which exhibits high tolerance for tension force having hook and loop fastening material 32 sewn on.

20. Safety Bar Ends are fitted over the ends of the safety bar 18 and can assume several shapes with faces such as cuboid or triangular prism. Safety bar ends 20 are rigid and can be comprised of, or can have attached, material which exhibits high friction properties like rubber. Safety bar ends 20 provide safety bar 15 with a means to engage an interior wall 38 adjacent to a window opening. Safety bar ends 20 frictionally engage interior wall 38 and prevents lateral and vertical movement of safety bar 18. Preferred embodiment for safety bar ends 20 are wood with rubber pads attached.

21. Safety Lanyard A length of stranded material which has loops at its ends. One end of safety lanyard 21 is attached to frame 1 by traversing through holes 31 in frame 1 and being attached onto itself. The other end of safety lanyard 21 is attached to itself which creates an opened loop. Said opened loop can have the rest of safety lanyard 21 inserted to create a larger loop. This larger loop can be placed around a large and/or heavy object to create an anchor for the present invention. Preferred embodiment for safety lanyard 21 is stainless steel cable with ferrules 28. 9510634 by Bookbinder Dec. 6, 2016 shows a lanyard which tethers an object to another object.

22. Screw Down Cable Clamp A device which uses a threaded fastener 51 to clamp onto items which have been inserted into the jaws of said screw down cable clamp 22. Screw down cable clamp 22 can be placed around, slid along the length, then clamped to any position along the length of safety lanyard 21. Screw down cable clamp 22 provides a means of attaching safety lanyard 21 to various objects or surfaces within the interior of the building from which the present invention protrudes. The preferred attachment point for screw down cable clamp 22 is to the horizontal support member above the window (header) or a vertical support member (stud) within the interior wall 38. Screw down cable clamps 22 are ubiquitous and can be readily obtained from many hardware retailers. Preferred embodiment for screw down cable clamp is metal with holes for a threaded fastener 51.

23. Barrier Planarly shaped device which closes an opening in frame 1 and can prevent traversal of insects and/or temperature differences between the outdoors and indoors. Barrier 23 can attach to barrier attachment strips 46 on frame 1, and can attach to barrier extension 25 with strategically placed hook and loop fastening material 32. Barrier 23 has an opening with fabric sewn around it into which embedded magnets 33 can be strategically placed. Said opening can facilitate a barrier door 24. Said opening in barrier 23 is situated as far as possible from where barrier extension 25 attaches to barrier 23 to facilitate as many attachment locations as possible for barrier extension 25 to attach to barrier 23 which allows different sized spaces between barrier 23 and frame extension 2 to be traversed by barrier extension 25. One embodiment of barrier 23 can be non-metallic mesh screen material 48 with woven fabric material borders having hook and loop fastening material 32 attached at predetermined locations. Another embodiment of barrier 23 can be water-resistant fabric with woven fabric material borders having hook and loop fastening material sewn on at predetermined locations. Yet another embodiment of barrier 23 can be removable layers of mesh screen material 32 and fabric having hook and loop fastening material 32 attached at predetermined locations.

24. Barrier Door Planarly shaped device which closes an opening in barrier 23 and can prevent traversal of insects and/or temperature differences between the outdoors and indoors. Barrier door 24 can swing toward the outdoors and toward the indoors. Magnets 33 can be strategically placed at the lower extremity of the barrier door which are near magnets 33 which have been strategically placed in near an opening in barrier 23. Magnets 33 hold barrier door 24 in a position of planar equality with barrier 23 similarly to invention 4754797 by Sronce Jul. 5, 1998. Barrier door 24 has bristles 41 around its border to prevent insects from traversing the space between barrier 23 and barrier door 24. Barrier door 24 allows pets to freely traverse between indoors and outdoors. Preferred embodiment for barrier door 24 is non-metallic mesh screen material 48 with woven fabric material borders sewn on having hook and loop fastening material 32 at predetermined locations.

25. Barrier Extension Planarly shaped device which traverses an opening between barrier 23 and frame extension 2. Barrier extension 25 can prevent traversal of insects and/or temperature differences between the outdoors and indoors. Barrier extension 25 uses hook and loop fastening material 32 to attach to barrier 24 and barrier attachment strip 46 on frame extension 2. Barrier extension 25 can attach to directly to barrier attachment strip on frame 1 when barrier 23 in not present. Barrier extension 25 can have sections of bristles 41 near a window sash 37, window stool 35, and barrier 23 which prevent traversal of insects between outdoors and indoors through spaces between barrier extension 25 and barrier 23, window stool 35, and window sash 37. One embodiment of barrier extension 25 can be non-metallic mesh screen material 48 with woven fabric material borders having hook and loop fastening material 32 sewn on at predetermined locations. Another embodiment of barrier extension 25 can be water-resistant fabric with borders having hook and loop fastening material 32 sewn on at predetermined locations. Yet another embodiment of barrier extension 25 can be removable layers of mesh screen material 32 and fabric having have hook and loop fastening material 32 sewn on at predetermined locations.

26. Outdoor Screen A hollow cuboid shaped structure which can be removably attached to the interior of outdoor enclosure 11. Outdoor screen 26 can provide a pet, and interior of building, protection from insects. If outdoor screen 26 is installed, barrier 23 can be completely removed from frame 1. Outdoor screen 26 can be attached to enclosure 11 with generic attachment straps 49. Outdoor screen 26 can be attached to separation bar 15 with generic attachment straps 49. Preferred embodiment for outdoor screen 26 non-metallic screen material having woven fabric material borders which has hook and loop fastening material 32 as well as bristles 41 attached.

27. Shelf retainer A length of flexible material having sections of material with a larger width, size, or diameter at the ends of said flexible material. Shelf retainer 27 is prevented from exiting a hole 31 in frame 1 by said sections of material with larger widths, sizes, or diameters. Shelf retainer 27 can be inserted into cable slots 47 in shelves (7 and 8) which holds said shelves in a position of planar equality with frame 1. Shelf retainer holds the invention in a folded state for storage. Preferred embodiment for shelf folding retainer 27 is stainless steel cable with cable stops.

28. Ferrule A common device which is crimped onto two sections of cable attaching said two sections together. Ferrules 28 are ubiquitous and can be readily obtained from many hardware retailers.

29. Cable stop A common device which is crimped around a cable. Cable stops 29 are ubiquitous and can be readily obtained from many hardware retailers.
30. Slot A linear hole in a solid body or surface.
31. Hole A hollow place in a solid body or surface
32. Hook and Loop Fastening Material This material can be used to fasten and two objects together by simply pressing said objects together, or unfasten two objects by simply peeling them away from each other. One part of hook and loop fastening material 32 is many small loops in close proximity to each other. One part of hook and loop fastening material 32 is many small hooks in close proximity to each other. When both parts of the hook and loop fastening material 32 are pressed together; many of the small hooks engage many of the small loops and hold both parts of the invention together. Similar to the amazing invention 2717437 by de Mistral Oct. 15, 1952.
33. Magnet Ferrous material which exhibits properties of magnetism.
34. Window Sash Channel A vertical channel which guides a window sash during vertical movement and contains said window sash.
35. Window Stool A shelf on the indoor side of the window sashes at the bottom of window.
36. Window Sill A tilted shelf on the outdoor side of the window sashes at the bottom of window. The tilt directs all water away from the building and window.
37. Window Sash A moveable section of a common window.
38. Interior Wall A wall which exists in the interior of a building.
39. Window Frame A window member which holds window sash channels 34 in a vertical position and next to each other as well as fastens window to structural members within a wall.
40. Window Casing Decorative material which borders the top and sides of a window opening.
41. Bristles Several strands of material of a short length which are oriented in the same direction and situated in a close group.
42. Attachment Cable Stranded material used to attach enclosure 11 to frame 1 and outdoor shelf 7 as well as attach barrier attachment 46 to frame 1 and frame extension. Preferred embodiment for attachment cable 42 is stainless steel cable. 43. Attachment Hole Pair of small holes in close proximity to each other which accommodate traversal of attachment cable 42 through frame 1, frame extension 2, and outdoor shelf 7.
44. Climbing Net Lock Ends of climbing net 9 which are larger than the climbing net 9 rope and cannot fit through the slot part of the climbing net attachment hole 45.
45. Climbing Net Attachment Hole Keyhole shaped hole through indoor shelf 8 to which climbing net 9 can attach to. Climbing net attachment hole 45 has a circular shaped section with a slot which originates from the said circular shaped section and ends in close proximity to said circular shaped section.
46. Barrier Attachment Strip Material with hook and loop fastening material 32 attached to it. Preferred embodiment for barrier attachment 46 is woven fabric material which exhibits high tolerance for tension force which having hook and loop fastening material 32 attached to it.
47. Cable Slot A slot which allows suspension cable 10 or shelf retainer 27 to be inserted and removed. At one end of cable slot 47, there is a countersunk hole partially through the material into which cable slot 47 exists. Said countersunk hole accommodates the seating of a cable stop 29 or something similar.
48. Mesh Screen Material An interlaced structure of material made of a network of wire or thread.
49. Generic Attachment Strap Can be a strip of woven fabric material used to attach objects to each other by wrapping around said objects and attaching onto itself. Preferred embodiment for generic attachment strap 49 is woven fabric material which exhibits high tolerance for tension force having hook and loop fastening material 32 attached to it.
50. Peg A cylindrically shaped piece of material used to fix objects to a certain location relative to each other.
51. Threaded Fastener A piece of cylindrically shaped material which has one groove around it situated in a non-perpendicular fashion relative to said cylindrically shaped material. As said groove traverses around said cylindrically shaped material, it passes directly next to where it passed around said cylindrically shaped material previously. The net result of this configuration, said groove resembles a gradual slope around said cylindrically shaped material. The common screw is a threaded fastener.
52. Cable Stop Seat A countersunk hole partially through material at an end of cable slot 47.

What is claimed is:
1. An opened window mounted insert, said insert comprising:
   a. a frame having a first side and a second side opposite said first side, said frame having an opening extending therethrough;
   b. a frame extension connected to a first side end of said frame by an extension rod and permitting movement of said frame extension relative to said frame via said rod's sliding in to and out of a respective hole in said first side end;
   c. a first strap extending from a lower portion of said frame and a second strap extending from a lower portion of said extension, said first strap and said second strap each forming a loop, said loops receiving a safety bar;
   d. a first shelf extending from said first side and a second shelf extending from said second side, each said shelf having a suspension cable extending from said respective shelf to a respective side of said frame; and
   e. said frame having at least one flange extending from an upper portion of said frame.

* * * * *